United States Patent [19]

Noguchi et al.

[11] 4,230,072
[45] Oct. 28, 1980

[54] INTERNAL COMBUSTION ENGINE WITH A METHANOL REFORMING SYSTEM

[75] Inventors: Masaaki Noguchi, Nagoya; Masaharu Sumiyoshi, Toyota; Tsuchio Bunda, Okazaki; Taro Tanaka, Chiryu, all of Japan

[73] Assignee: Nippon Soken, Inc., Nishio, Japan

[21] Appl. No.: 31,158

[22] Filed: Apr. 18, 1979

Related U.S. Application Data

[60] Division of Ser. No. 913,206, Jun. 6, 1978, abandoned, which is a continuation of Ser. No. 641,603, Dec. 17, 1975, abandoned.

[30] Foreign Application Priority Data

| Dec. 20, 1974 [JP] | Japan | 49-147057 |
| Aug. 22, 1975 [JP] | Japan | 50-102469 |
| Aug. 26, 1975 [JP] | Japan | 50-103653 |
| Aug. 28, 1975 [JP] | Japan | 50-104804 |

[51] Int. Cl.³ .................. F02B 43/08; F02M 13/06
[52] U.S. Cl. ........................ 123/1 A; 123/3; 123/575
[58] Field of Search .......... 123/1 A, 3, 127, DIG. 12

[56] References Cited

U.S. PATENT DOCUMENTS

| 1,966,345 | 7/1934  | Harrell          | 123/3   |
| 3,908,606 | 9/1975  | Toyoda et al.    | 123/3   |
| 3,915,125 | 10/1975 | Henkel et al.    | 123/3   |
| 3,976,034 | 8/1976  | Shinohara et al. | 123/1 A |
| 3,977,366 | 8/1976  | Yamaguchi et al. | 123/3   |
| 3,986,350 | 10/1976 | Schmidt          | 123/3   |
| 4,037,568 | 7/1977  | Schreiber        | 123/1 A |

Primary Examiner—Charles J. Myhre
Assistant Examiner—Craig R. Feinberg
Attorney, Agent, or Firm—Cushman, Darby & Cushman

[57] ABSTRACT

An internal combustion engine has a primary fuel circuit for producing a lean mixture of air and hydrocarbon fuel to be fed into a combustion chamber and a secondary fuel circuit which includes a secondary carburetor for producing a mixture of air and methanol at an air-methanol ratio of less than 2.0. The air-methanol mixture is fed into a reactor vessel having therein a catalyst bed which is heated to facilitate reaction between the components of the air-methanol mixture. By the reaction the air-methanol mixture is converted into a reformed gaseous mixture rich with hydrogen which is then mixed with an air-hydrocarbon fuel mixture to form a composite mixture to be supplied into the combustion chamber. The existence of hydrogen in the composite mixture assures reliable spark-ignition and stable combustion of the composite mixture which is of a very large air-fuel ratio as calculated in terms of air-gasoline ratio, to thereby reduce the emission of harmful components of engine exhaust gas and improve the fuel consumption.

7 Claims, 19 Drawing Figures

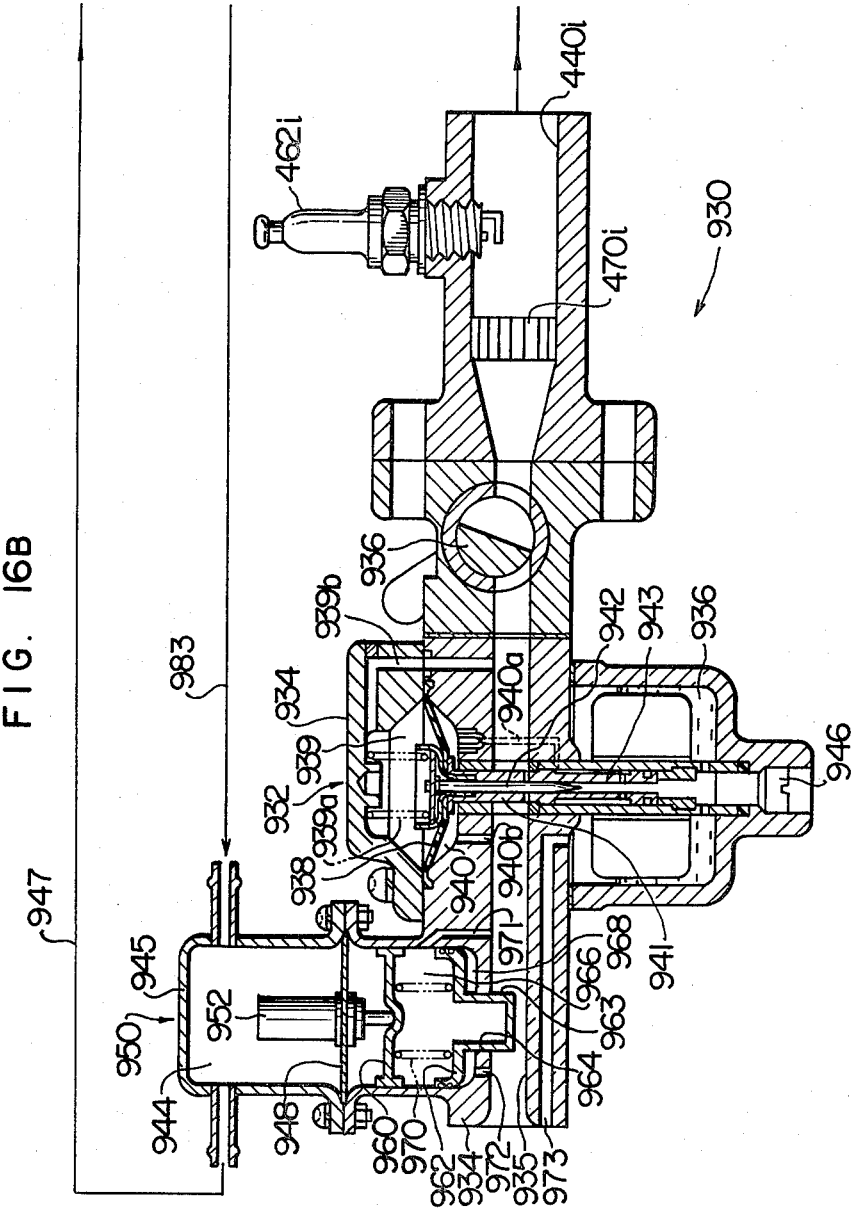

INTERNAL COMBUSTION ENGINE WITH A METHANOL REFORMING SYSTEM

This is a division, of application Ser. No. 913,206 filed June 6, 1978 now abandoned; which is a Continuation of Application Ser. No. 641,603 filed Dec. 17, 1975 now abandoned.

BACKGROUND OF THE INVENTION

1. Field of the Invention

The present invention relates to an internal combustion engine intended to reduce the emission of the harmful components of engine exhaust gas and prevent increase in the fuel consumption normally caused by an emission control. Particularly, the invention is concerned with an internal combustion engine equipped with a system for converting a mixture of air and methanol into a reformed gaseous mixture rich with hydrogen and for supplying the reformed gaseous mixture to the engine to thereby improve the combustion therein.

2. Description of the Prior Art

In order to reduce the emission of harmful components of engine exhaust gases, there has been proposed an internal combustion engine of an arrangement such that, before a hydrocarbon fuel such as gasoline is mixed with air and introduced into a combustion chamber of the engine, the fuel is mixed with water, air and engine exhaust gas to form a mixture. The mixture is then fed into a reactor having catalysts which cause reaction between the components of the mixture at a temperature ranging from 250° to 1,000° C. so that a part of the fuel is converted into a reformed gaseous mixture including hydrogen or carbon monoxide. The reformed mixture is then introduced into a combustion chamber of the engine. There has also been proposed an another arrangement such that gaseous hydrogen from a hydrogen container is mixed with a hydrocarbon fuel and supplied therewith into a combustion chamber of an internal combustion engine.

The first arrangement required a water container which caused a problem such that the water in the container was frozen resulting in bursting of the container in winter season or a cold district. In the case where the fuel used contained a compound of lead, the engine exhaust gas which recirculated into the reactor contained the compound of lead by which the catalysts were damaged. Even in the case where the fuel did not contain a compound of lead, soot and/or tar was included in the engine exhaust gas and deposited on the surfaces of the catalysts to reduce the efficiency of the catalysts. The reformed gaseous mixture, moreover, included gaseous components which were unnecessary for the engine operation and which reduced the efficiency of charge of the reformed gaseous mixture into the combustion chambers of the engine and adversely affected the engine performance. Furthermore, when a fuel containing cyclic hydrocarbon and gum, such as gasoline, light oil or kerosene, soot or tar was deposited on the surfaces of the catalysts, the inner surface of the reactor and the passages extending between the reactor and the combustion chamber of the engine, deterioration of the catalysts and blockade of the passages resulted.

The second arrangement required a hydrogen bottle which presented a danger of explosion. The hydrogen bottle was inevitably bulky in size and heavy. Thus, the second arrangement was not suitable for an internal combustion engine for use in an automobile.

So as to purify engine exhaust gases, there has also been proposed a torch ignition type (or stratified charge) internal combustion engine comprising a main combustion chamber for receiving a lean air-fuel mixture and an auxiliary chamber (to be called "trap chamber" hereinunder) for receiving a rich mixture to be ignited by a spark plug to form a flame by which the lean mixture in the main chamber is ignited to produce power therein. The total of the lean and rich mixture is lean as a whole to reduce the harmful components of the engine exhaust gas. With this type of the engine, it has been found that the engine is operable by the ignition of an air-fuel mixture having an air-fuel ratio up to about 18 to 24 contrary to the upper limit air-fuel ratio of about 18 for the operation of a normal internal combustion engine without a trap chamber. It has been known that, in order to effectively attain the reduction in the emission of harmful nitrogen oxides ($NO_x$) contained in engine exhaust gases, an air-fuel mixture must be burnt at a very lean air-fuel ratio of larger than 18. The problem caused when such a very lean air-fuel mixture is burnt in the torch ignition type combustion engine is that variation of cycle timing due to delayed ignition of the lean mixture or delayed propagation of flame causes variation of torque on the output shaft of the engine with a resultant tendency that, when the engine is mounted in an automobile, a surging is caused by the engine torque variations and a resonance of the engine with the power trains results. This greatly lowers the operability of the automobile notwithstanding the fact that combustion of the lean air-fuel mixture is possible with the engine. In addition, with an air-fuel mixture having an air-fuel ratio of larger than 20, the volume of the non-combustible strata of the mixture adjacent to the walls of the combustion chamber is increased with a disadvantageous problem that the emission of unburnt hydrocarbon (HC) is extremely increased.

SUMMARY OF THE INVENTION

It is an object of the present invention to eliminate the above-discussed problems by supplying a combustion chamber of an internal combustion engine with a composite mixture of air-hydrocarbon fuel having a reformed gaseous mixture converted from a mixture of air and methanol at an air-methanol ratio of less than 2.

It is another object of the present invention to introduce the reformed gaseous mixture into a main combustion chamber or a trap chamber of a torch ignition type internal combustion chamber through a primary intake port or a secondary intake port of the engine for preventing the variation of cycle timing during the combustion of a very lean air-fuel mixture, reducing the volume of the non-combustible strata of the mixture for the reduction of the emission of the hydrocarbons and increasing the burning velocity of the lean mixture for the improvement in the fuel consumption.

According to the present invention, there is provided an internal combustion engine comprising: a combustion chamber; and a methanol reforming system for converting a mixture of air and methanol into a reformed gaseous mixture rich with hydrogen and supplying the reformed gaseous mixture to the combustion chamber. The methanol reforming system includes a reforming reactor which is in communication with the combustion chamber and a means in communication with the reforming reactor for supplying the mixture of air and methanol thereto at an air-methanol ratio of less than 2.

The above feature of the invention assures a reliable combustion having an air-fuel mixture of a very lean air-fuel ratio with a resultant decrease in the harmful components of engine exhaust gas, improvement in the fuel consumption and elimination of the prior art problems wherein soot and tar were formed in the process of the reforming reaction and deposited on the catalysts and the inner surfaces of passages to deteriorate the catalysts and cause blockage of the passages.

The invention will be described by way of example with reference to the accompanying drawings.

BRIEF DESCRIPTION OF DRAWINGS

FIG. 16B is a diagrammatic, fragmentary, sectional side elevation of the rest of the ninth embodiment shown in FIG. 16A;

DESCRIPTION OF THE PREFERRED EMBODIMENTS

As the fuel to be mixed with air to form an air-fuel mixture which is to be converted and reformed according to the present invention into a gaseous mixture rich with hydrogen, alcohols other than methanol may also be taken into consideration. However, alcohols having more than 3 carbons in 1 molecule are not preferred because, with these alcohols, soot and tar are formed at the time of the reforming reaction between the components of the mixture of air and the alcohols and the soot is deposited on the surfaces of catalysts in a reforming reactor vessel to lower the catalysis of the catalysts. As compared with methanol, ethanol is less preferable in that, as will be seen in Table 1 which shows the results of catalytic reactions between the components of an air-methanol mixture and between the components of an air-ethanol mixture, ethanol produces more soot and tar contained in the "others" in Table 1. In addition, ethanol is more expensive than methanol. Methanol is therefore practically useful and preferred.

Table 1

Results of catalytic reactions between components of air-methanol mixture and between components of air-ethanol mixture

| Kinds of alcohols | Supply of air (c.c./min.) | Reformed gaseous mixture (c.c./min.) | Components of reformed gaseous mixture | | | | | | Water produced (c.c./min.) |
|---|---|---|---|---|---|---|---|---|---|
| | | | Hydrogen | Nitrogen | Carbon monoxide | Methane | Carbon dioxide | Others | |
| Methyl alcohol | 100 | 305 | 45.0% | 26.2% | 20.1% | 2.9% | 5.7% | 0.03% | 0.015 cc/min |
| | | | 137 cc/min | 80 cc/min | 61 cc/min | 9 cc/min | 17 cc/min | 1 cc/min | |
| Ethyl alcohol | 100 | 230 | 20.9% | 34.8% | 16.9% | 9.1% | 6.9% | 20.4% | 0.013 cc/min |
| | | | 48 | 80 | 39 | 21 | 16 | 47 | |

Table 1-continued

| Kinds of alcohols | Supply of air (c.c./min.) | Reformed gaseous mixture (c.c./min.) | Results of catalytic reactions between components of air-methanol mixture and between components of air-ethanol mixture | | | | | | Water produced (c.c./min.) |
|---|---|---|---|---|---|---|---|---|---|
| | | | Components of reformed gaseous mixture | | | | | | |
| | | | Hydrogen | Nitrogen | Carbon monoxide | Methane | Carbon dioxide | Others | |
| | | | cc/min | cc/min | cc/min | cc/min | cc/min | cc/min | |

Figure 1:
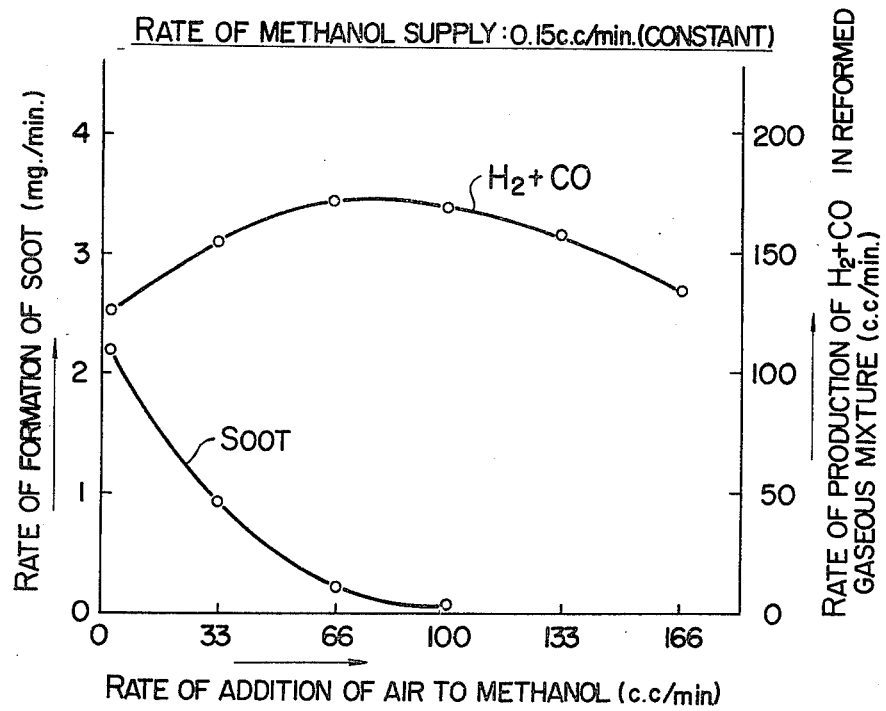
FIG. 1 graphically illustrates the relationship between the amount of air (c.c.) added to 0.15 c.c. of methanol per minute of time relative to the amount of soot (mg.) formed from the air-methanol mixture per minute of time and the relationship between the amount of air (c.c.) added to 0.15 c.c. of methanol per minute of time relative to the total amount (c.c.) of hydrogen ($H_2$) and carbon monoxide (CO) contained in a gaseous mixture converted and reformed from the air-methanol mixture per minute of time.

Condition for reactions
Catalyst temperature: 500° C.
Catalyst used: Pt-Al$_2$O$_3$
Rate of fuel supply: 0.15 cc/min It is preferred that the amount of air added to methanol according to the present invention is such that little soot is deposited on the surfaces of the catalysts and other elements of a reactor vessel and such that large amounts of hydrogen and carbon monoxide are produced. As will be seen in FIG. 1, the most preferred amount of air is about 15% by volume of the amount of air required for the stoichiometrical or complete combustion of methanol (stoichiometrical air-methanol ratio is 6.5) (FIG. 1 shows that the addition of 100 cubic centimeters of air per minute of time to 0.15 cubic centimeters of methanol per minute of time is most preferred.). This will be substantially equal to an air-methanol ratio of 0.65 (equal to 1/10 of the stoichiometrical air-methanol ratio). The reaction between the chemical components of the air-methanol mixture of this air-methanol ratio will be represented by the following thermochemical equation:

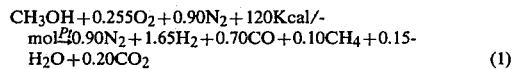
$$CH_3OH + 0.255O_2 + 0.90N_2 + 120 Kcal/mol \underset{\longleftarrow}{\longrightarrow} 0.90N_2 + 1.65H_2 + 0.70CO + 0.10CH_4 + 0.15H_2O + 0.20CO_2 \quad (1)$$

As will be seen in the above equation, the reaction is an endothermic one with the absorption of 102Kcal. Thus, the chemical energy of a reformed gaseous mixture converted from an air-methanol mixture may be increased than with respect to that of the air-methanol mixture, so that the chemical energy of the fuel can be increased by the utilization of the heat of, for example, an engine exhaust gas. With an air-methanol ratio of more than 0.65, the above endothermic reaction is inverted to an exothermic reaction with the resultant increase in the production of carbon dioxide and decrease in the production of hydrogen and carbon monoxide. With an air-methanol ratio of more than 2, the meritorious effect obtainable from the supply of the reaction products, i.e., the reformed gaseous mixture, into an internal combustion engine will be extremely reduced. On the other hand, the amount of soot formed when methanol is converted into a gaseous mixture is very small even at an air-methanol ratio of zero (0), i.e., even in an case wherein no air is added to methanol, as will be seen in FIG. 1. The formation of this very small amount of soot will not greatly adversely affect the endurance of catalysts of properly selected materials. Thus, the practically appropriate air-methanol ratio $\alpha_m$ of an air-methanol mixture to be introduced into a reforming system used in the present invention will be:

$$0 \leq \alpha_m \leq 2 \quad (2)$$

Catalysts are not necessarily required in the present invention but may preferably be used to facilitate a catalytic reaction. The catalysts when used may comprise any of commonly used catalyst materials. Examples of a useful catalysts are a metals such as, Pt, Pd, Ni, Co, Fe, Cu, or, Au, and alloy or oxides of these metals and components of a normal ceramic material such as Al$_2$O$_3$, SiO$_2$, MgO, CaO, ZnO and the like. However, the components and the volume of the reformed gaseous mixture, the reforming reaction starting temperature and the formation of soot will vary with different kinds of catalysts. Of the abovementioned kinds of catalysts, catalysts mainly comprising Pt and catalysts mainly comprising Ni were found to be most effective. With respect to the reaction temperature, the initiation of the production of the gaseous mixture occurs from a temperature of about 250° C. but, the practically preferred range of the reaction temperature is from about 300° to 700° C.

Embodiments of the invention will now be described with reference to FIGS. 2 to 18.

Figure 2:
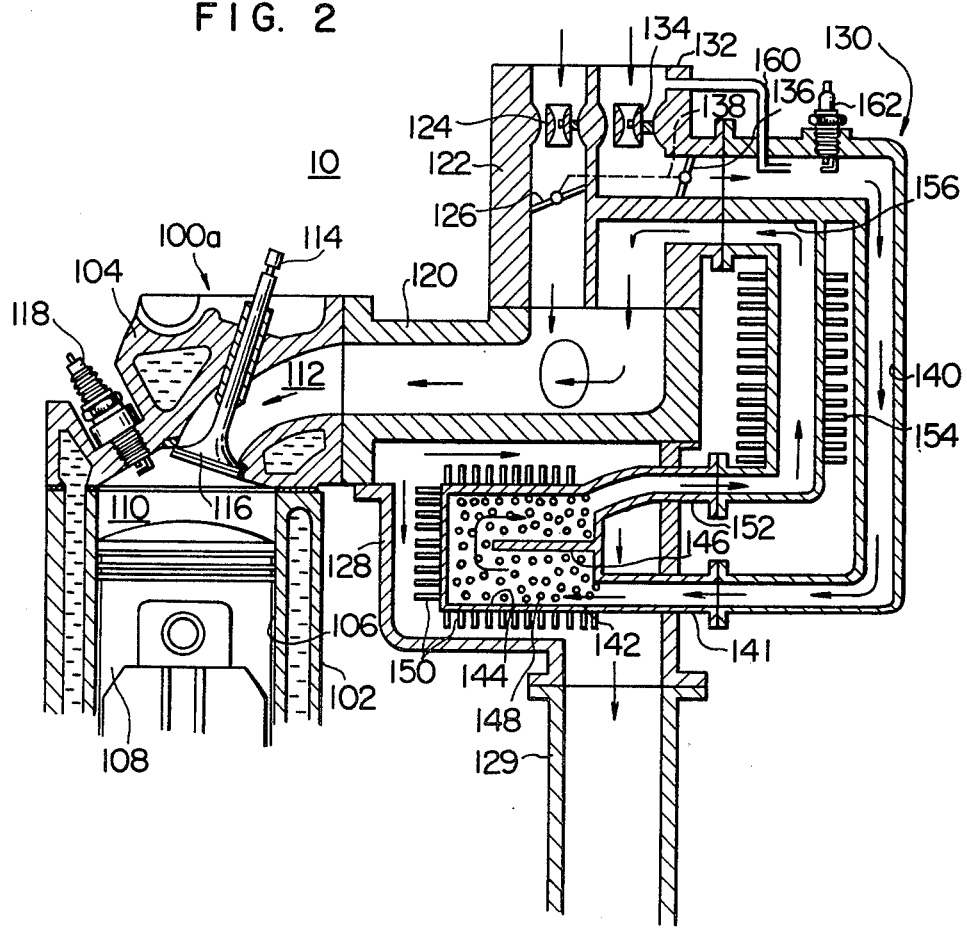
FIG. 2 is a diagrammatic, fragmentary sectional side elevation of a first embodiment of the internal combustion engine according to the present invention.

Referring to FIG. 2, a first embodiment of an internal combustion engine according to the present invention is generally indicated by 10 and includes an engine body 100a which comprises a cylinder block 102 and a cylinder head 104 mounted on the top of the cylinder block. The cylinder block 102 defines therein cylinders 106 only one of which is shown. A piston 108 is reciprocally received in the cylinder 106 to cooperate with the cylinder 106 and the bottom surface of the cylinder head 104 to define a combustion chamber 110. The cylinder head 104 is formed therein with an intake port 112 and an exhaust port (not shown). An intake valve 114 is reciprocally mounted on the cylinder head 104 so that a valve head 116 of the intake valve is operative to open and close the intake port 112 in a conventional manner. A spark plug 118 is mounted on the cylinder head 104 so that electrodes of the spark plug are exposed to the combustion chamber 110.

The intake port 112 is connected at its upstream end with an intake pipe 120 which in turn is connected at its upstream end with a primary fuel circuit comprising a primary carburetor 122 having a venturi 124 for producing a mixture of air and a hydrocarbon fuel such as gasoline. A throttle valve 126 is provided in the primary fuel circuit downstream of the venturi 124 for controlling the primary fuel supply into the combustion chamber 110 in a known manner.

Exhaust gases from respective exhaust ports (not shown) are gathered into an exhaust gas gathering portion 128 of an exhaust manifold and then passed into an exhaust pipe 129 connected thereto.

The engine 10 is provided with a methanol reforming system generally indicated by 130. The system 130 is for converting a mixture of air and methanol into a reformed gaseous mixture rich with hydrogen. For this purpose, the system 130 includes a secondary carburetor 132 which is formed integral with the primary carburetor 122 in the embodiment shown and which is provided with a venturi 134 for producing the air-methanol mixture at an over-rich air-methanol ratio which ranges from 1/20 to 1/5 of the stoichiometrical air-methanol ratio (6.5). A secondary throttle valve 136 is provided in the secondary carburetor 132 and is operatively connected to the throttle valve 126 by an appropriate connecting means such as a link mechanism 138.

The secondary carburetor 132 is connected by a passage 140 to an inlet port 141 of a reforming reactor vessel 142 which is disposed in the exhaust gas gathering portion 128. The reactor vessel 142 defines therein a reaction chamber 144 and has a baffle member 146 which cooperates with the inner surface of the vessel 142 which is to define a labyrinth passage filled with catalyst particles 148. The reactor vessel 142 is provided with a plurality of external fins 150 for increasing the area of the outer surface of the reactor vessel 142 in contact with the engine exhaust gas so that the catalyst particles 148 are effectively heated by the engine exhaust gas to facilitate reforming reaction between the components of the air-methanol mixture. As the result of the reforming reaction, the air-methanol mixture is converted into a reformed gaseous mixture rich with hydrogen, as discussed above. The reactor vessel 142 has an outlet port 152 connected to a cooler 154 disposed in heat exchange relationship with the atmospheric air. The downstream end of the cooler 154 is connected by a passage 156 to the intake pipe 120.

The air-methanol mixture is supplied with secondary air by a passage 160 which bypasses the secondary venturi 134 and the secondary throttle valve 136 and is open into the passage 140 downstream of the throttle valve 136. A part of the over-rich air-methanol mixture is thus diluted by the secondary air to an air-methanol ratio at which the mixture is ignitable by a spark plug 162 mounted on the methanol reforming system downstream of the downstream end of the secondary air supply passage 160. The spark plug 162 is operative to cause an imperfect oxidation reaction of a part of the air-methanol mixture to heat the catalyst particles 148 in the reactor vessel 142 by the heat produced by the reaction for thereby facilitating the reforming reaction in the reactor vessel 142 when the engine is cold-started. Even after the engine is warmed up, the spark plug 162 is operative to facilitate the atomization of methanol at a transition point such as at the time of acceleration or deceleration of the engine for thereby making good the engine response at that time. The spark plug 162 may be replaced by an electric heater comprising a Nichrome wire (trade name) or tantalum wire.

With the arrangement described above, the rich air-methanol mixture produced by the secondary carburetor 132 is heated by the spark plug 162 and then introduced into the reforming reactor vessel 142 with a part of the mixture being imperfectly oxidized. The mixture is converted into a reformed gaseous mixture by the action of the catalyst particles 148 effectively kept at a high temperature by the engine exhaust gas. The reformed gaseous mixture is discharged at a high temperature from the reactor vessel 142 into the cooler 154 and thereby cooled and, thereafter, flows through the passage 156 into the intake pipe 120 in which the reformed gaseous mixture thus cooled is mixed with the lean air-gasoline mixture from the primary carburetor 122 to thereby form a further mixture of air, gasoline and reformed gaseous mixture. The further mixture thus formed will be called hereunder "composite mixture" which is fed through the intake port 112 into the combustion chamber 110 and ignited by the spark plug 118.

As an example, tests showed that a composite gaseous mixture in which the ratio of the volume of liquid methanol relative to the total volume of liquid gasoline and liquid methanol fed as the primary fuel from the primary carburetor was from 1:20 to 1:4 was stably ignited and burnt in a 1600 cc. 4-cylinder engine (compression ratio: 8.5). The engine was operated well with the composite gaseous mixture even when the equivalent air-fuel ratio of the composite gaseous mixture calculated in terms of gasoline was larger than 20 (excess air ratio $\lambda$ was equal to 1.3). As compared with the case in which the engine was operated with a mixture of air and gasoline only (air-fuel ratio was from 16 to 18), it was recognized that the efficiency of combustion of the engine when operated with the composite gaseous mixture in the above-mentioned condition was improved, that the thermal efficiency of the entire engine was also improved 10 to 20% because of the utilization of the heat of the engine exhaust gas and that, for the same thermal efficiency, the emission of $NO_x$ from the engine was reduced 50 to 80%.

Figure 3:
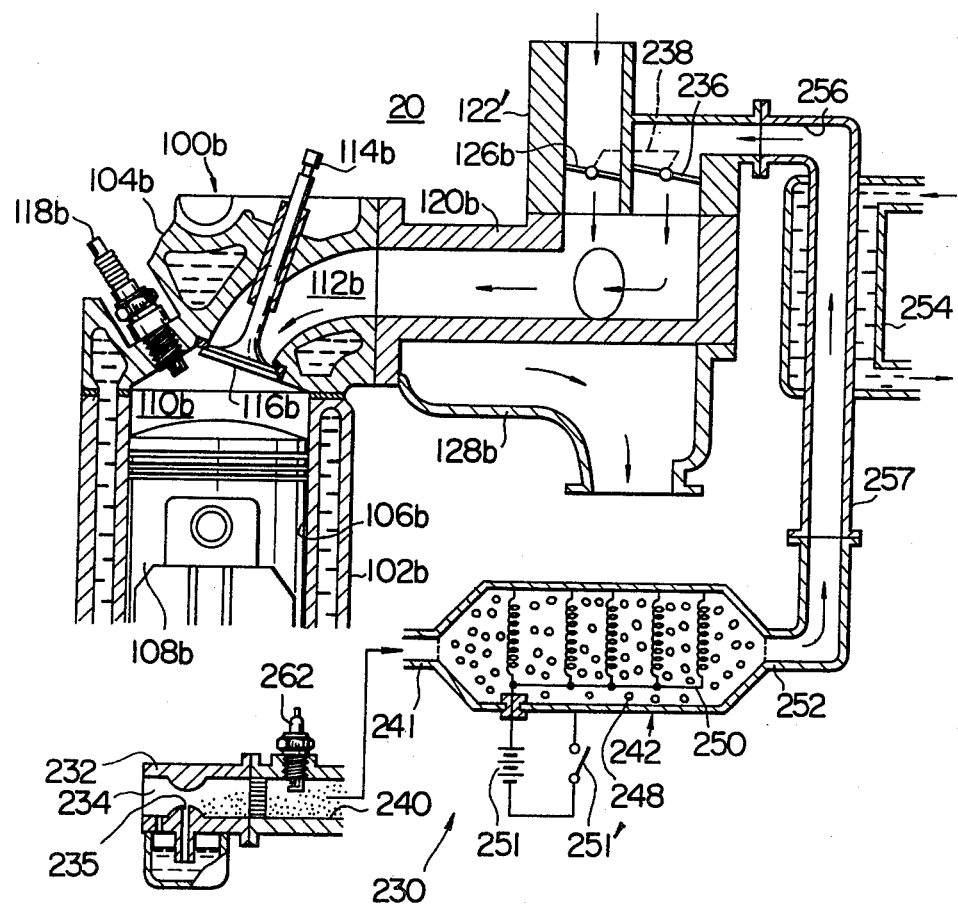
FIG. 3 is a view similar to FIG. 2 but illustrates a second embodiment of the present invention.

FIG. 3 shows a second embodiment of the internal combustion engine of the present invention. The embodiment is generally designated by 20 and comprises an engine body which is generally indicated by 100b and which is substantially similar in construction to the engine body 100a of the first embodiment. Similar elements and parts of the engine body 100b are designated by similar reference numerals with a character "b" added. The engine of the embodiment is designed to be supplied only with a mixture of air and a gaseous mixture reformed from a mixture of air and methanol, as will be described in more detail later. For this purpose, an intake pipe 120b of the engine 20 is connected with a simple air inlet pipe 122' in which a primary throttle valve 126b is provided.

A methanol reforming system 230 of the engine 20 includes a carburetor 232 of a horizontal draft type disposed separately from the air inlet pipe 122' and having a venturi 234 into which liquid methanol is jetted through a nozzle 235 so that the carburetor 232 produces a mixture of air and methanol, this mixture is introduced into a reforming reactor vessel 242 through a passage 240 interconnecting the carburetor 232 and an inlet port 241 of the reactor vessel 242. The reactor vessel is filled with catalyst particles 248 which are heated by an electric heater 250 comprising heating elements of Nichrome wire (trade name) or the like disposed in the reactor vessel 242 and extending through a bed formed of the catalyst particles. The heater 250 is adapted to be energized by a power source 251 and controlled by a switch 251'. Because the reactor vessel 242 is not of a design which is heated by engine exhaust gas, the reactor vessel 242 can advantageously be disposed at a place where the reactor vessel does not suffer the engine vibration.

The air-methanol mixture fed into the reforming reactor vessel 242 is thus converted into a reformed gaseous mixture as in the first embodiment. The reformed gaseous mixture is then discharged at a high temperature from the reactor vessel 242 through its outlet port into a passage 252 formed by a pipe 257 which passes through a cooler 254 through which engine cooling water is circulated. Thus, the reformed gaseous mixture is cooled by the cooling water substantially to a predetermined temperature and then introduced into the intake pipe 120b in which the reformed gaseous mixture is mixed with air from the air inlet pipe 122' and diluted by the air and introduced into a combustion chamber 110b through an intake port 112b. A secondary throttle valve 236 is disposed at the downstream end of the passage 256 to control the flow of the reformed and cooled gaseous mixture into the intake pipe 120b and is operatively connected to the primary throttle valve 126b by a link mechanism 238. The water-cooling of the reformed gaseous mixture is advantageous in that the mixture is cooled substantially to said predetermined temperature. This makes it possible to easily control the amount of the reformed gaseous mixture and thus the amount of methanol fed into the combustion chamber.

The second embodiment is simpler in construction compared with the first embodiment in that only a single fuel supply circuit is required. The second embodiment is also advantageous in that the mixture which is of air and the reformed gaseous mixture rich with hydrogen is ignitable and combustible for a wider range of air-methanol ratio compared with an air-gasoline mixture and thus produces stable combustion in the engine. The ratio of air and the reformed gaseous mixed to be mixtured together depends upon the ratio of the opening of the primary throttle valve 126b relative to the opening of the secondary throttle valve 236. The opening ratio between the throttle valves may be controlled dependent upon the load on the engine to advantageously decrease the pump loss of the engine as in the fuel controlling system for Diesel engines and also advantageously improve the fuel consumption of the engine when operated in partial load condition.

The use of the horizontal draft type carburetor 232 is also advantageous in that the methanol jetted from the nozzle 235 tends to flow close to the bottom of the horizontally directed passage 240. In the vicinity of a spark plug 262 extending into the passage 240 just downstream of the carburetor 232, there is produced a lean air-methanol mixture of a richness which is appropriate for the ignition by the spark plug 262. Thus, the second embodiment does not require any secondary air supply passage such as the passage 160 provided in the first embodiment.

Figure 4:
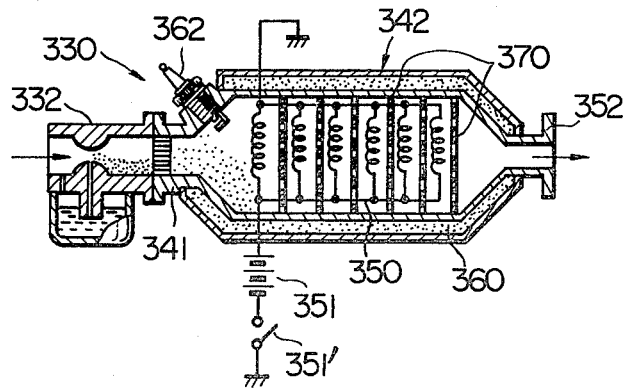
FIG. 4 is a diagrammatic, longitudinal sectional view of a reforming reactor vessel of a methanol reforming system of a third embodiment of the invention.

FIG. 4 illustrates a third embodiment of the present invention. The embodiment comprises a methanol reforming system which is generally designated by 330 and includes a horizontal draft type carburetor 332 similar to the carburetor 232 of the second embodiment. The carburetor 332 is intended to produce a mixture of air and is methanol and connected to a reforming reactor vessel 342 which is not filled with catalyst particles but designed to cause a reforming reaction in the vessel by means of a spark plug 362 extending into the vessel and electric heater 350 disposed therein. The vessel 342 is covered with a layer 360 of a heat insulating material. A plurality of wire screens or perforated sheets is metal 370 are disposed in the reactor vessel 342 and extend transversely of the axis of the vessel. The wire screens or perforated sheets of metal 370 are spaced axially of the reactor vessel 342. Heating elements of the electric heater 350 are each disposed in a space between each adjacent pair of the wire screens or perforated sheets of metals 370 and are parallel-connected to a power source 351. Preferably the electric heater 350 is continuously energized to heat the air-methanol mixture in the reactor vessel at the time when the air-methanol ratio is of a value at which the reforming reaction between the components of the air-methanol mixture is an endothermic reaction. However, when the air-methanol ratio is of a value at which the reforming reaction is an exothermic reaction, the heater 350 may be energized only when the reactor vessel 342 is at a low temperature, such as when the engine is cold-started.

The reactor vessel 342 is connected to an engine body (not shown) which may be similar in construction to either the engine body 100a of the first embodiment or the engine body 100b of the second embodiment to supply a reformed gaseous mixture rich wih hydrogen in a manner similar to that in the first or second embodiment, whereby the emission of harmful components of the engine exhaust gas is greatly reduced.

Figure 5:
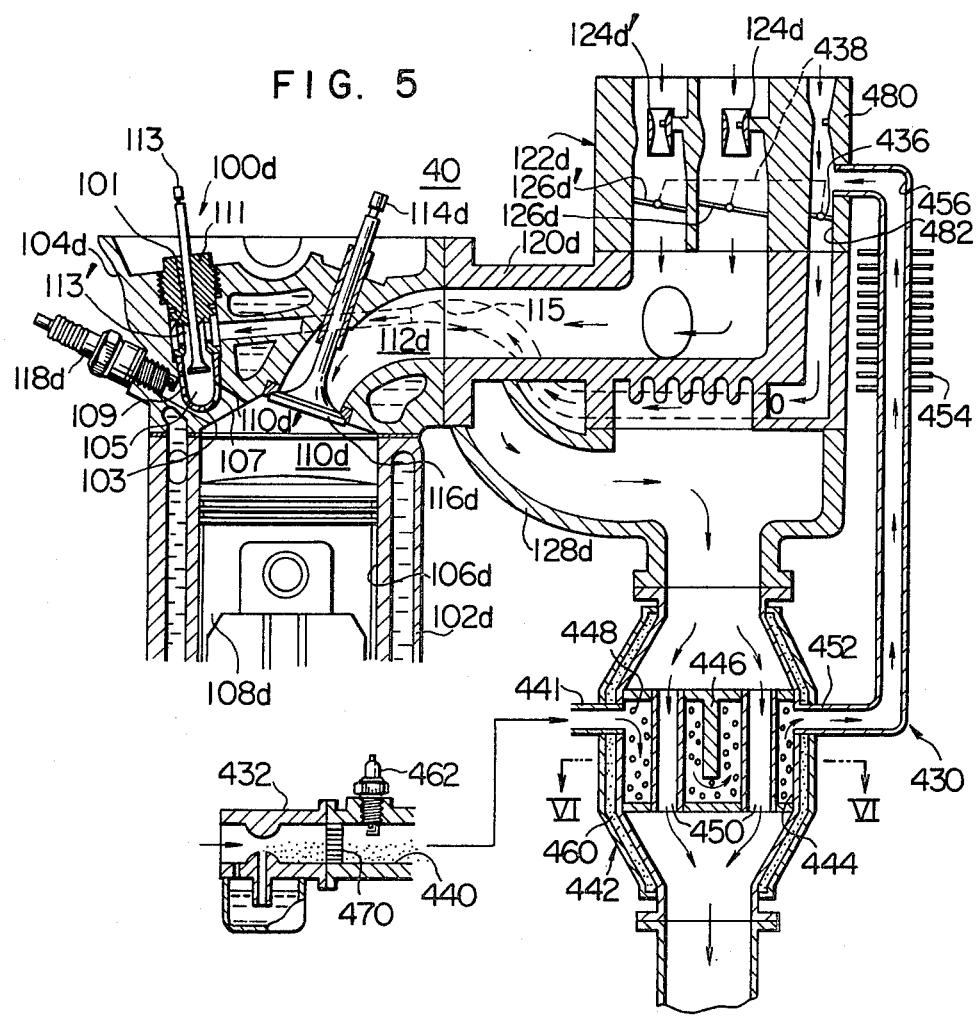
FIG. 5 is a view similar to FIG. 2 but illustrates a fourth embodiment of the invention.
Figure 6:
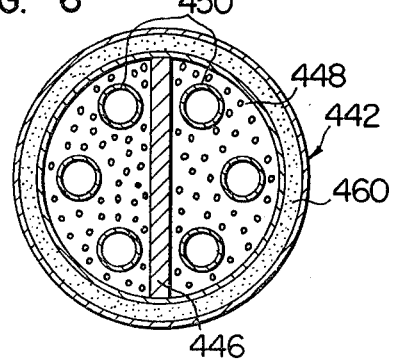
FIG. 6 is an enlarged cross-sectional view of a reforming reactor vessel of the fourth embodiment taken along line VI—VI in FIG. 5.

A fourth embodiment of the invention shown in FIGS. 5 and 6 is a torch ignition type internal combustion engine or stratified charge engine generally designated by 40. The engine includes an engine body 100d. The parts of the engine body 100d which are similar to those of the first embodiment shown in FIG. 2 are indicated by similar reference numerals with a character "d" added. Only the differences of the engine body 100d from the engine body 100a in FIG. 2 will be described hereunder. A combustion chamber 110d will be termed the "main combustion chamber" for reasons to be made apparent later. The main combustion chamber 110d includes a recess 110d' formed in a cylinder head 104d. A spark plug 118d projects into the recess 110d'. A substantially vertical bore 101 extends from the upper surface of the cylinder head 104d and merges with the recess 110d'. A cup-shaped member 103 is placed in the bore 101 so that a hemispherical end of the cup-shaped member protrudes into the recess 110d'. A space 105 in the cup-shaped member 103 will be called the "trap chamber" which is communicated with the recess 110d' and thus with the main combustion chamber 110d through an opening 107 formed in the cup-shaped member 103. The trap chamber 105 is also communicated with the electrodes of the spark plug 118d through a second opening 109 also formed in the cup-shaped member 103. The bore 101 is closed at its upper end by a plug member 111 through which a secondary intake valve 113 is reciprocally movable. An axial passage 113' is formed in the inner end portion of the plug member 111 and communicated with a secondary intake port 115 formed in the cylinder head 104d independently of a primary intake port 112d. The peripheral edge of the axial passage 113' acts as a valve seat which cooperates with a valve head of the secondary intake valve 113 to control the communication between the trap chamber 105 and the secondary intake port 115.

The primary intake port 112d is connected at its upstream end to an intake pipe 120d which in turn is connected to a primary carburetor 122d to complete a primary fuel circuit. The carburetor 122d is of the two barrel two stage type having venturii 124d and 124d' disposed in the respective barrels and throttle valves 126d and 126d'.

A methanol reforming system 430 of the fourth embodiment includes a carburetor 432 for producing a mixture of air and methanol. This carburetor may be similar in construction to the carburetor 232 shown in FIG. 3. The carburetor 432 is connected by a passage 440 to an air-methanol mixture inlet port 441 of a reforming reactor vessel 442 having a substantially circular cross-section, as best shown in FIG. 6, and is covered with a layer 460 of a heat insulating material. The inlet port 441 is formed in the peripheral wall of the vessel 442. The air-methanol mixture from the carburetor 432 is introduced through the inlet port 441 into a reaction chamber 444 defined in the vessel 442. A baffle wall 446 is provided in the reaction chamber 442 to form a labyrinth passage which is filled with catalyst particles 448 forming a catalyst bed which extends across the interior of the reactor vessel 442.

The reactor vessel 442 is connected at its one axial end to an exhaust gas gathering portion 128d so that the engine exhaust gas flows into the reactor vessel 442. A plurality of passages 450 extend axially through the catalyst bed so that the engine exhaust gas flows through the passages 450 in heat exchange relationship with the catalyst bed.

The air-methanol mixture introduced into the reaction chamber 444 flows through the catalyst bed and is thus converted into a reformed gaseous mixture which is discharged at a high temperature from the reactor vessel 442 through its outlet port 452 into a cooler 454 and thereby cooled. The downstream end of the cooler 454 is connected to a passage 456 which in turn is connected to a secondary fuel circuit to be discussed hereunder.

The secondary fuel circuit comprises a secondary carburetor 480 for producing a rich mixture of air and gasoline. In the embodiment shown, the carburetor 480 is integral with the primary carburetor 122d and is connected by a secondary intake passage 482 to the secondary intake port 115 in the cylinder head 104d. A secondary throttle valve 436 is disposed in the secondary intake passage 482 and is operatively connected to the primary throttle valves 126d and 126d' by any conventional connecting means such as link mechanism 438. The passage 454 is connected to the secondary intake passage 482 upstream of the secondary throttle valve 436.

In the described embodiment, the carburetor 432 produces a mixture of air and methanol at an air-methanol ratio of about 1/10 of the stoichiometrical air-methanol ratio. The mixture is fed into the reactor vessel 442 and converted in the manner discussed above into a reformed gaseous mixture rich with hydrogen. A spark plug disposed in the passage 440 downstream of the carburetor 432 may be operated when required to oxidize a part of the air-methanol mixture for the purpose described hereinabove. A flame arrester 470 is disposed between the carburetor 432 and the spark plug 462 to guard the carburetor against flame or flames produced by the combustion of the air-methanol mixture.

The reformed gaseous mixture is discharged from the reactor vessel 442 into the cooler 454 and cooled thereby and then introduced into the secondary intake passage 482 in which the reformed gaseous mixture is mixed with an air-gasoline mixture from the secondary carburetor 480 to form a composite mixture which is supplied through the secondary intake passage 482 and secondary intake port 115 into the trap chamber 105. On the other hand, a lean air-gasoline mixture having an air-gasoline ratio larger than 20 is produced by the primary carburetor 122d and is sucked through the primary intake port 112d into the main combustion chamber 110d on an intake stroke of the engine 100d. At this time, a part of the composite mixture flows from the trap chamber 105 through the aperture 107 into the main combustion chamber 110d. On a compression stroke of the engine, the mixtures in the main combustion chamber 110d and the trap chamber 105 are subjected to compression. Then, the mixture in the trap chamber 105 is first ignited by the spark plug 118d to produce a flame which spurts as a torch jet through the aperture 107 into the main combustion chamber, whereby the torch jet ignites the lean mixture in the main combustion chamber 110d. Because of the existence of the reformed gaseous mixture within the trap chamber 105 and the main combustion chamber 110d, the lean mixture within the main combustion chamber is caused to produce a stable combustion. The propagation of combustion is faster and more stable than that of a mere lean air-gasoline mixture to thereby eliminate the variation of cycle timing. The reformed gaseous mixture within the main combustion chamber also provides additional advantages in that the fuel consumption of the engine is improved and in that the non-combustible stratum of air-fuel mixture normally formed along the inner peripheral wall of the cylinder and the like is minimized to thereby effectively reduce the emission of unburnt hydrocarbon (HC).

Figure 7:
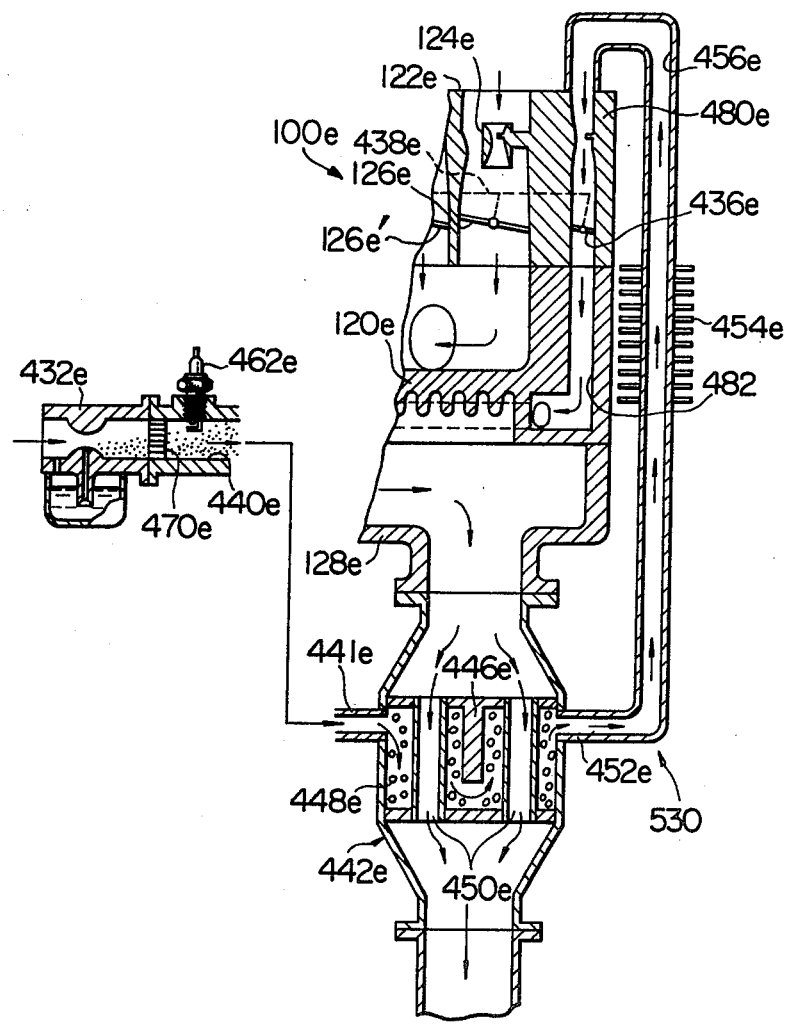
FIG. 7 is a diagrammatic, fragmentary, sectional side elevation of a fifth embodiment of the invention.

FIG. 7 illustrates a fifth embodiment of the invention which comprises a secondary fuel circuit generally indicated by 530. In the fourth embodiment shown in FIGS. 5 and 6, the secondary fuel circuit is arranged such that an air-methanol mixture is converted into the reformed gaseous mixture which is then mixed with an air-gasoline mixture to form a composite mixture to be fed into the trap chamber. The secondary fuel circuit 530 of the fifth embodiment, however, is constructed and arranged such that an air-methanol mixture is converted into a reformed gaseous mixture to which gasoline only is added to form a composite mixture to be supplied to a trap chamber of the engine. The secondary fuel circuit 530 is substantially similar in construction to the secondary fuel circuit 430 of the preceding embodiment with the exception that a passage 456e through which a reformed and cooled gaseous mixture flows is connected to the inlet of a carburetor 480e. The parts of the fifth embodiment similar to those of the fourth embodiment 40 are designated by similar reference numerals with a character "e" added.

Figure 8:
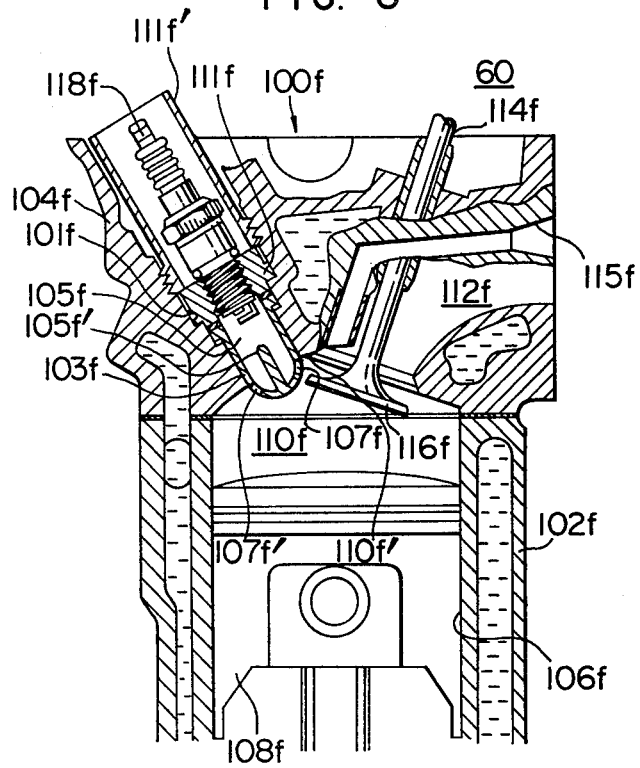
FIG. 8 is a diagrammatic, fragmentary, sectional side elevation of an engine body of a sixth embodiment of the invention.

FIG. 8 illustrates a sixth embodiment of the internal combustion engine generally indicated by 60. The embodiment comprises an engine body 100f which is of the torch ignition type and includes a primary intake port 112f connected to a primary fuel circuit which is not shown but may be similar to the primary fuel circuit shown either in FIG. 5 or in FIG. 7 so than a lean air-gasoline mixture is supplied through the primary intake port 112f into a main combustion chamber 110f. A cup-shaped member 103f is fitted into a bore 101f in a cylinder head 104f so that the hemispherical end of the cup-shaped member protrudes into the main combustion chamber 110f. The cup-shaped member 103f defines therein a trap chamber 105f which is always in communication with the main combustion chamber 110f through apertures 107f and 107f formed in the hemispherical end of the member 103f. A spark plug 118f is mounted in the bore 101f by means of a cup retainer 111f so that the electrodes of the spark plug 118f are disposed within the trap chamber 105f adjacent the end thereof remote from the main combustion chamber. The cup-retainer 111f is fixed to the cylinder head 104f by means of an externally threaded sleeve member 111f' screwed into the cylinder head 104f and surrounding the outer end of the spark plug 118f.

A secondary intake port 115f is formed in the cylinder head 104f and has a downstream end open to the primary intake port 112f adjacent the downstream end thereof, i.e., just above the back face of a valve head 116f of an intake valve 114f. The upstream end of the secondary intake port 115f may be connected with a secondary fuel circuit shown either in FIG. 5 or in FIG. 7 so that a composite gaseous mixture rich with gasoline and hydrogen is supplied to the secondary intake port 115f.

The engine body 100f is not provided with an intake valve for the secondary fuel circuit. Instead, the supply of the secondary gaseous fuel (i.e., the composite mixture) into the trap chamber 105f is controlled by the valve head 116f of the intake valve. When the intake valve 114f is moved to its open position, the composite mixture flows out of the downstream end of the secondary intake port 115f. A substantial part of the composite mixture is guided by and flows along a wall portion 110f' of the main combustion chamber 110f to the aperture 107f and then into the trap chamber 105f. For this purpose, the aperture 107f is directed to the downstream end of the primary intake port 112f. The trap chamber 105f is partially divided into two zones, one directly communicated with the aperture 107f and the other with the aperture 107f', by a partition 105f' provided on the hemispherical end portion of the cup-shaped member 103f between the apertures 107f and 107f' and extending into the trap chamber 105f a distance toward the electrodes of the spark plug 118f. The two zones of the trap chamber merge together in the vicinity of the spark plug electrodes, so that the composite mixture introduced into the trap chamber 105f through the aperture 107f is prevented by the partition 105f' from flowing from the aperture 107f directly to the other aperture 107f'. The partition 105f' effectively guides the composite mixture toward the spark plug to insure that the composite mixture is retained within the trap chamber 105f in the vicinity of the spark plug electrodes and is ignited thereby.

The remaining parts and elements of the engine body 100f are similar to those of the engine body 100d shown in FIG. 5 and thus are indicated by similar reference numerals with a character "f" added. The internal combustion engine 60 will be operated in a manner similar to the engine 40 shown in FIGS. 5 and 6.

In the fourth to sixth embodiments described above, the reformed gaseous mixture is supplied only through the secondary intake port into the trap chamber. However, the reformed gaseous mixture may be supplied also through the primary intake port into the main combustion chamber in such a manner that the air-fuel ratio of the composite mixture supplied to the main combustion chamber is equal to the air-gasoline ratio of an air-gasoline mixture normally supplied to the main combustion chamber. The supply of the reformed gaseous mixture into the main combustion chamber advantageously reduces the variation of cycle timing which otherwise would be caused by the delayed propagation of the flames the engine cylinders when a lean air-gasoline mixture only is supplied to the main combustion chambers, whereby the fuel consumption is improved.

In addition, the trap chamber may be supplied with the reformed gaseous mixture only as in the embodiment shown in FIG. 7. In the case of a normal internal combustion engine without a trap chamber, in order to obtain a combustion of a lean air-fuel mixture by adding the reformed gaseous mixture to an air-gasoline mixture, the ratio of hydrogen contained in the reformed gaseous mixture relative to the total of the fuel supplied to the engine must be more than 5% by weight. To the contrary, a stratified charge internal combustion engine with a trap chamber has an advantage that the inclusion of a less than 5% by weight of hydrogen of the reformed gaseous mixture in the total of fuel supplied to the engine will be sufficient to produce stable combustion in the engine because it is possible with this type of engine to feed in stratified fashion the hydrogen-containing reformed gaseous mixture to a place in the trap chamber in the vicinity of a spark plug to thereby produce a combustion of the reformed gaseous mixture in the trap chamber and thus of a lean air-gasoline mixture in the main combustion chamber.

Figure 9:
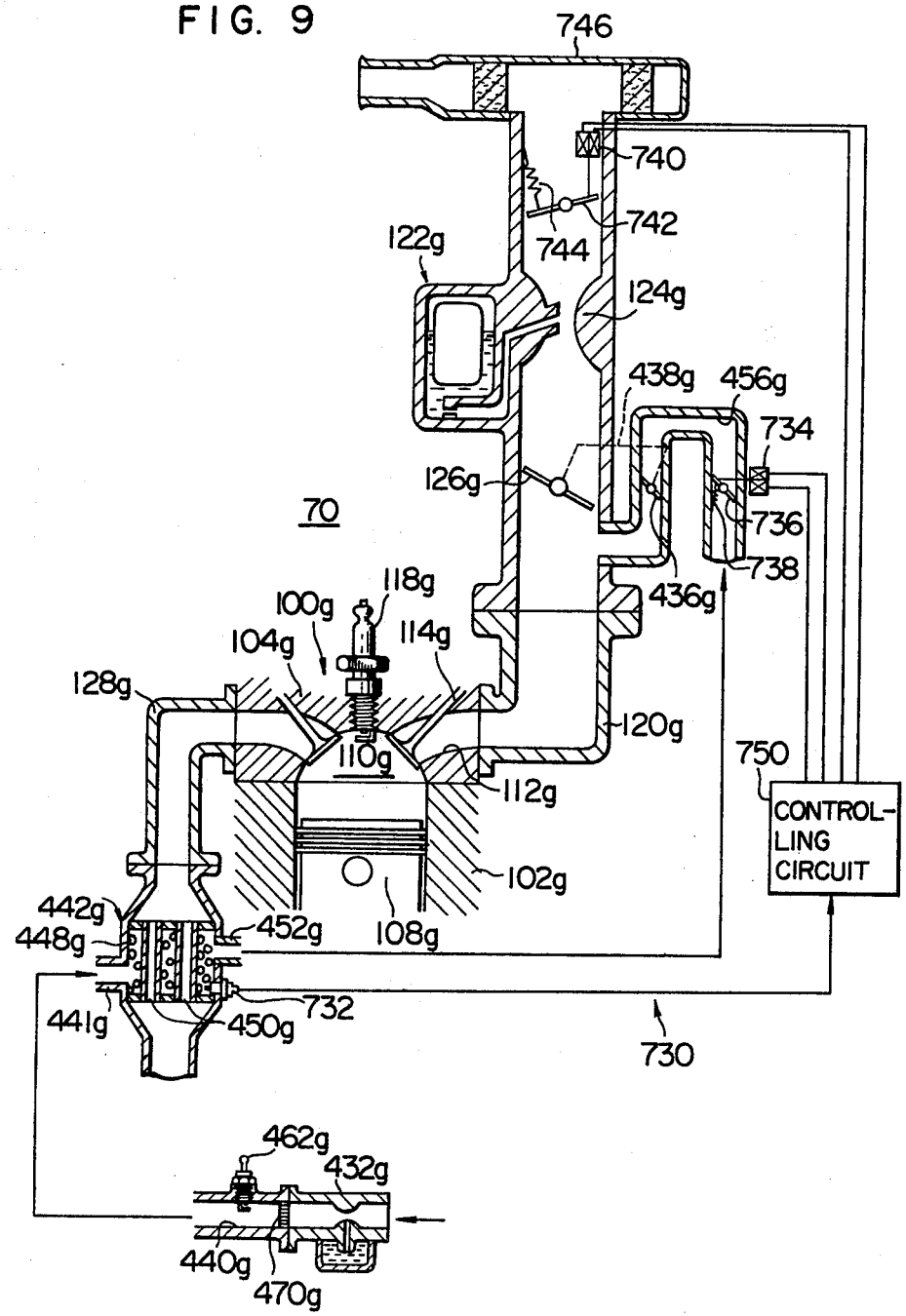
FIG. 9 is a diagrammatic, fragmentary, sectional side elevation of a seventh embodiment of the invention.
Figure 10:
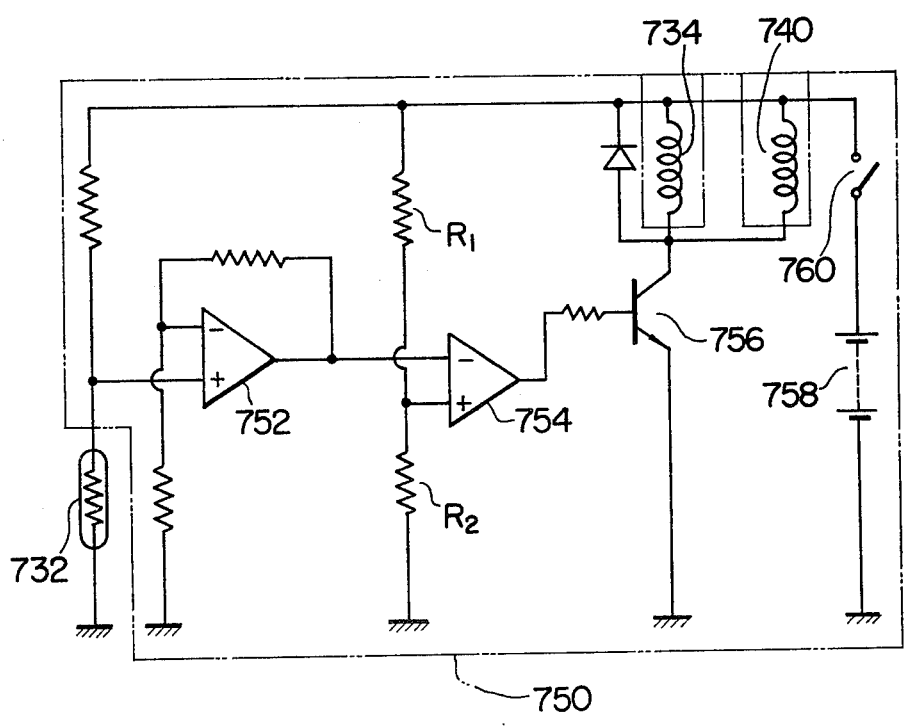
FIG. 10 is a block diagram illustrating electric circuits of the controlling circuit shown in FIG. 9.

FIGS. 9 and 10 illustrate a seventh embodiment of the present invention. When the reforming reactor vessels of the preceding embodiments are not at a temperature high enough to reform an air-methanol mixture, for example, when the engine is cold-started, the mixture is not converted into a reformed gaseous mixture rich with hydrogen with the result that methanol is fed to the combustion chamber in the non-converted form. This will mean that a combustion of a lean air-fuel mixture by the supply of a reformed gaseous mixture is not attained. If the air-fuel ratio of a composite mixture including air, gasoline and methanol calculated in terms of gasoline is maintained at a large value (lean air-fuel mixture), it will cause a bad condition of the engine and, in the worst case, an engine stall. When a reactor vessel is in reforming operation, the air-methanol mixture is converted into a reformed gaseous mixture the volume of which just downstream of the reactor vessel is greatly expanded. However, when the reactor vessel is not in operation, the reactor vessel causes little expansion of the air-methanol mixture. For the same degree of opening of a throttle valve disposed downstream of the reactor vessel, the flow of air through a carburetor disposed upstream of the reactor vessel is greatly varied whether or not the reactor vessel is in reforming operation. The consumption of methanol is varied accordingly. Namely, when the reactor vessel is at a low temperature and not in reforming operation, the methanol consumption is increased to cause a rise of cost of methanol per calory and results in waste of methanol. The seventh embodiment of the invention shown in FIGS. 9 and 10 is intended to eliminate the above problem.

Referring first to FIG. 9, the internal combustion engine of the seventh embodiment is generally indicated by 70 and includes an engine body 100g which is substantially similar in construction to the engine body 100a shown in FIG. 2. Similar parts of the engine body 100g are designated by similar reference numerals with a character "g" added. A fuel circuit of the engine 70 comprises a primary carburetor 122g which produces a mixture of air and a hydrocarbon fuel at its venturi 124g. The supply of the air-hydrocarbon fuel mixture to a combustion chamber 110g is controlled by a primary throttle value 126g disposed in the fuel circuit downstream of the carburetor 122g.

The internal combustion engine 70 also includes a methanol reforming system which is generally indicated by 730, a part of which is generally similar to the methanol reforming system 430 of the embodiment shown in FIG. 5. The parts of the methanol reforming system similar to those of the system 430 are indicated by similar reference numerals with a character "g" added. A description will be made mainly with respect to the difference of the methanol reforming system 730 from the methanol reforming systems of the fourth to sixth embodiments of the invention.

A secondary carburetor 432g will produce a mixture of air and methanol at an air-methanol ratio of less than 2. The air-methanol mixture is introduced into a reforming reactor vessel generally indicated by 442g and converted into a reformed gaseous mixture by catalytic particles preferably comprising Ni or Cu. The catalysts are adapted to be heated by engine exhaust gas in a manner similar to that described above. The reformed gaseous mixture flows out of the reactor vessel and through a passage 456g into the fuel circuit downstream of the primary throttle valve 126g.

The methanol reforming system 730 does not include a coller for cooling the reformed gaseous mixture discharged from the reactor vessel 442g but, instead, comprises controlling means which will be described hereunder. A temperature sensor in the form of a thermistor 732 is mounted on the reactor vessel 442g for measuring the temperature therein. The thermistor 732 is electrically connected to a controlling circuit 750 which is operative to decide, dependent on the output of the thermister 732, as to whether or not the temperature within the reactor vessel 442g is high enough for the reforming reaction. The controlling circuit 750 is electrically connected to a solenoid 734 to control the power supply to the solenoid 734 so that the solenoid actuates a valve 736 disposed in the passage 456g against a return spring 738. A secondary throttle valve 436g is disposed in the passage 456g downstream of the shut-off valve 736 and is operatively connected to the primary throttle valve 126g by conventional connecting means such as a link mechanism 438g. The controlling circuit 750 is also electrically connected to a second solenoid 740 to control the power supply to the solenoid so that the solenoid controls a choke valve 742 disposed upstream of the primary carburetor 122g so that the flow of air from an air cleaner 746 to the primary carburetor 122g is controlled by the choke valve 742 to vary the ratio of air and the hydrocarbon fuel produced by the primary carburetor 122g. The choke valve 742 is provided with a return spring 744.

The controlling circuit 750 will be described in more detail with reference to FIG. 10. The controlling circuit includes an amplifier 752 for amplifying the voltage across the thermistor 732. A comparator 754 receives the output of the amplifier 752 and compares it with a preset voltage which is determined by resistors R1 and R2. The output signals of the comparator 754 control the "on" and "off" states of a transistor 756 so that it switches on and off the electric current from a power source 758 to the solenoids 734 and 740. A key switch 760 is provided in the circuit between the solenoid 734 and 740 and the power source 758.

In operation, when the engine is coldstarted and the catalyst bed in the reactor vessel 442g is at a low temperature at which the air-methanol mixture cannot be converted into the reformed gaseous mixture, the thermistor 732 presents such a large resistance that the output of the amplifier 752 of the controlling circuit 750 is larger than the preset voltage for the comparator 754 with the result that the comparator 754 output goes to the "0" level to make the transistor 756 non-conductive. Thus, the electric current will not flow to the solenoids 734 and 740. Thus, the shut-off valve 736 is returned to its closed position by the return spring 738 to block the passage 456g, so that no methanol is jetted into a venturi in the carburetor 432g becuase it is shut-off from the vacuum produced in the engine. On the other hand, as the solenoid 740 is deenergized, the choke valve 742 is closed to a predetermined extent by its return spring 744 so that the air-fuel ratio of the air-hydrocarbon fuel mixture produced by the primary carburetor 122g becomes smaller (richer) than in the normal operating condition of the engine to thereby assure a reliable and smooth engine operation.

The engine operation is continued with resultant rise of the temperature of the engine exhaust gas, so that the catalyst particles 448g in the reactor vessel 442g are heated to a temperature high enough for the reforming reaction of the air-methanol mixture. Then the resistance of the thermistor 732 becomes so small that the output of the amplifier 752 of the controlling circuit 750 is rendered smaller than the preset voltage for the comparator 754 with the result that the comparator output goes to the "1" level and thus the transistor 756 is rendered conductive. The solenoids 734 and 740 are therefore supplied with electric current and energized thereby. The shutoff valve 736 is thus moved to its open position aganst the return spring 738 to subject the carburetor 432g to the vacuum in the engine, so that the carburetor 432g produces a mixture of air and methanol at a predetermined air-methanol ratio which is less than 2. The air-methanol mixture thus produced is ignited by a spark plug 462g, then introduced through a passage 440g into the reactor vessel 442g in which the mixture is converted into a reformed gaseous mixture rich with hydrogen by the action of the heated catalyst particles 448g.

On the other hand, as the solenoid 740 is energized, the choke valve 742 is moved to its open position against the return spring 744 with the result that the air-fuel ratio of the mixture of air and hydrocarbon fuel produced by the primary carburetor 122g is increased; i.e., the mixture becomes very lean. The flow of the reformed gaseous mixture and of the lean air-hydrocarbon fuel mixture into the intake port 112g is controlled by the secondary throttle valve 436g and the primary throttle valve 126g operatively connected thereto to thereby form a composite mixture which includes hydrogen, as previously discussed, and thus can be ignited and burnt in the combustion chamber 110g notwithstanding the fact that the airfuel ratio of the composite mixture calculated in terms of air-gasoline ratio is very lean. The airmethanol mixture can be converted substantially completely (i.e., substantially 100%) into the reformed gaseous mixture when the catalyst bed is heated to about 250° C. in the case wherein the catalysts 448g mainly comprise Ni or Cu. Thus, the shut-off valve 736 and the choke valve 742 may preferably be opened at a temperature of around 250° C. This temperature may vary with the kinds of the catalysts.

The seventh embodiment described is designed such that the supply of methanol is completely stopped when the reactor vessel is at a low temperature. However, the supply of methanol may be gradually varied with the variation in the temperature in the reactor vessel so that the methanol supply is gradually increased with the temperature rise.

Figure 11:
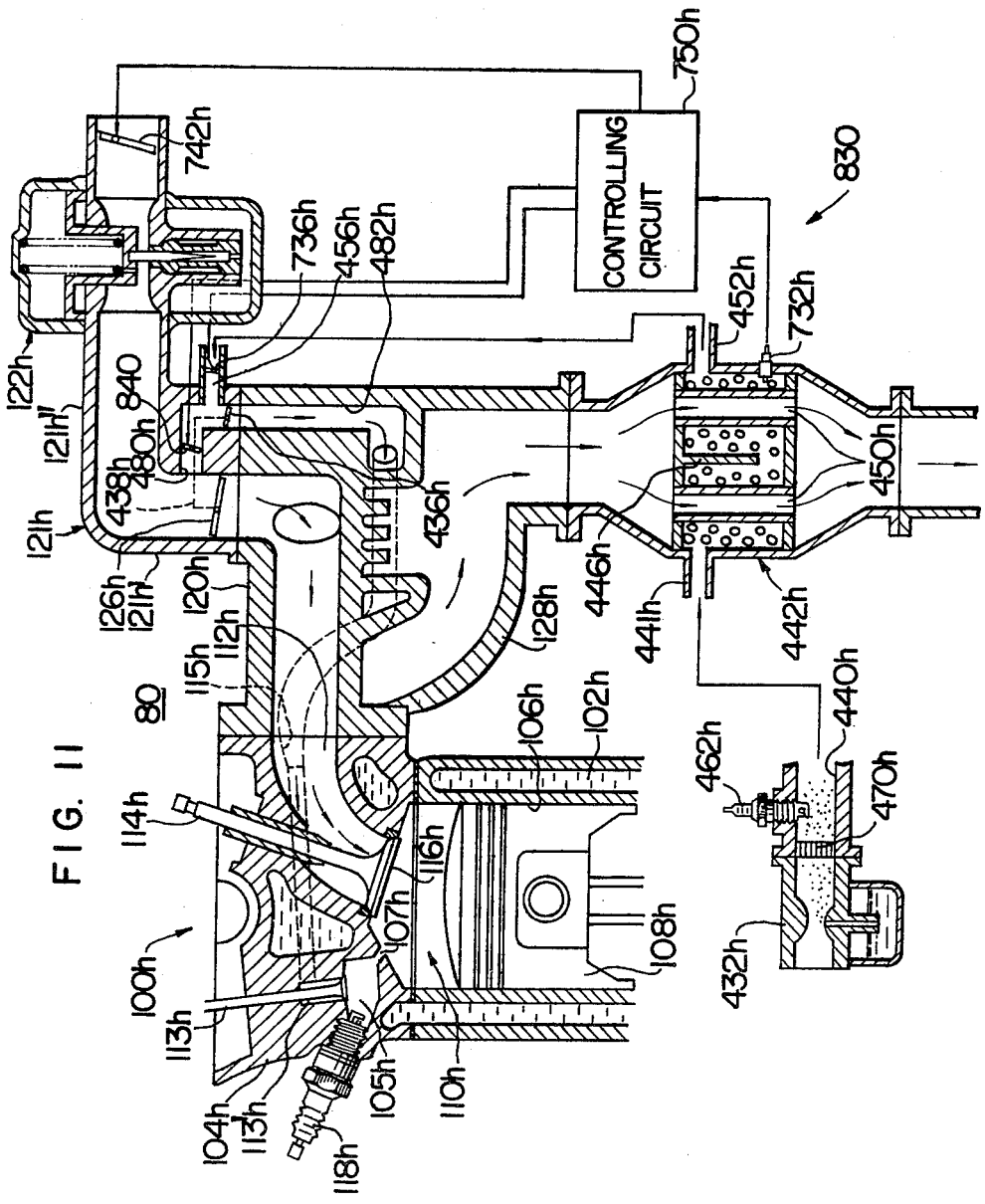
FIG. 11 is a view similar to FIG. 9 but illustrates an eighth embodiment of the invention.
Figure 12:
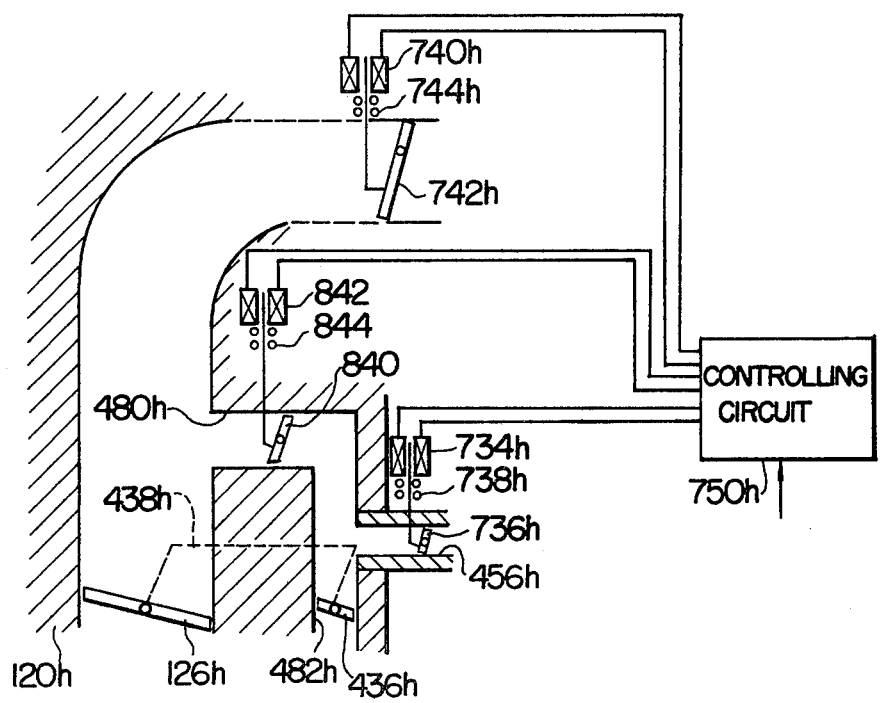
FIG. 12 is an enlarged, diagrammatic, fragmentary, sectional side view of a part of the construction shown in FIG. 11.
Figure 13:
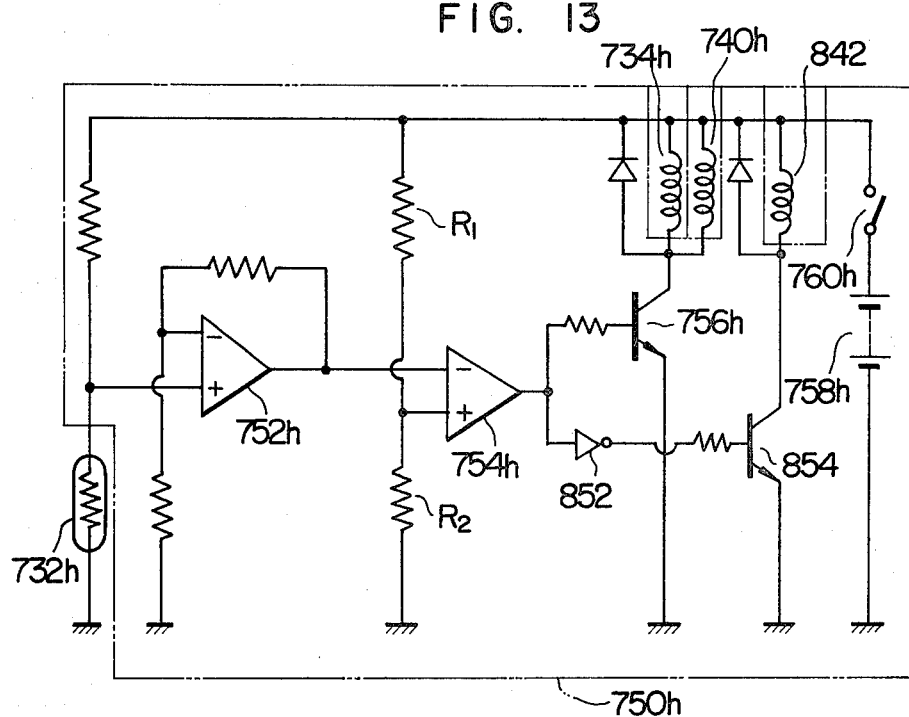
FIG. 13 is a block diagram of electric circuits of the controlling circuit shown in FIGS. 11 and 12.

FIGS. 11 to 13 illustrate an eighth embodiment of the present invention directed to a torch ignition type internal combustion engine with a methanol reforming system which is provided with means for assuring proper engine operation when reforming reactor vessel is at a low temperature, as will be described later. The eighth embodiment is generally designated by 80 and includes a torch ignition type engine generally indicated by 100h. The engine is substantially similar in structure to the engine 100d of the fourth embodiment shown in FIG. 5. Similar parts are designated by similar reference numerals with a character "h" added. The difference will be described hereunder.

The primary fuel circuit of the engine 100h includes a primary intake port 112h formed in the cylinder head 104h. A primary intake valve 114h is mounted on the cylinder head so as to control the communication between the main combustion chamber 110h and the primary intake port 112h. The primary intake port is connected to a primary intake pipe 120h which in turn is connected through an elbow pipe 121h to a primary carburetor 122h which is of a horizontal draft, variable venturi type. A primary throttle valve 126h is provided in a vertical part 121h' of elbow pipe 121h.

A trap chamber 105h is formed in a cylinder head 104h and communicated with the main combustion chamber 110h by a passage 107h which may be termed a "torch port" for a reason which will be made apparant later. A substantially vertical bore 113'h is formed in the cylinder head 104h and opens at the bottom end to the trap chamber 105h. The other end of the bore 113'h is connected to a substantially horizontal secondary intake port 115h. A secondary intake valve 113h is reciprocally mounted on the cylinder head 104h so that the valve head of the secondary intake valve controls the communication between the trap chamber 105h and the bore 113'h. The secondary intake port 115h is connected to a secondary intake passage 482h which is connected by a horizontal passage 480h to the vertical part 121h' of the elbow pipe 121h upstream of the primary throttle valve 126h. A secondary throttle valve 436h is provided in the secondary intake passage 482h and is operatively connected to the primary throttle valve 126h by a connecting means such as a link mechanism 438h.

The methanol reforming system of the engine 80 is generally designated by 830. The methanol reforming system 830 is generally similar in part to the methanol reforming system 430 of the fourth embodiment shown in FIG. 5. Similar parts are indicated by similar reference numerals with the character "h" added. A passage 456h connected at one end to an outlet port 452h is connected at the other end to the secondary intake passage 482h upstream of the secondary throttle valve 436h.

The means for assuring the proper engine operation when the reforming reactor vessel is at a low temperature, referred to above, include a temperature senser in the form of a thermistor 732h which is electrically connected to a controlling circuit 750h. A first shut-off valve 736h is provided in the passage 456h. A second shut-off valve 840 is provided in the horizontal passage 480h. A choke valve 742h is provided in the primary fuel passage upstream of the primary carburetor 122h. The first and second shut-off valves 736h and 840 and the choke valve 742h are designed to be actuated by solenoids 734h, 842 and 740h, respectively, which are electrically connected to the controlling circuit 750h, as shown in FIG. 12.

Referring to FIG. 13, the controlling circuit 750h is similar in part to the controlling circuit 750 shown in FIG. 10. Similar parts are indicated by similar reference numerals with a character "h" added. The difference will be described hwereunder. The output end of a comparator 754h is in parallel connection with a first transistor 756h and an inverter 852. The collector electrode of the first transistor 756h is in parallel connection with the solenoids 734h and 740h, while the output end of the inverter 852 is connected to a second transistor 854, the collector electrode of which is connected to the solenoid 842.

The operation of the eighth embodiment of the invention will be described hereunder. When the engine is cold-started and the catalyst bed within the reactor vessel 442h is at a low temperature at which the catalysts are not active to convert an air-methanol mixture into a reformed gaseous mixture, the thermistor 732h has a large resistance. Thus, the output of an amplifier 752h is so large that the output of comparator 754h is rendered "0" to make the first transistor 756h non-conductive with the result that the solenoids 734h and 740 are deenergized. Thus, the first shut-off valve 736 is moved to its closed position by a return spring 738h. The choke valve 742h is also closed to a predetermined extent by a return spring 744h. However, as the second transistor 854 receives the output signal of the comparator 754h after the signal has been inverted, the transistor 854 is rendered conductive so that the solenoid 842 is energized to move the second shutoff valve 840 to its open position against a return spring 844. The carburetor 432h is thus shut-off from the vacuum produced in the engine and does not produce a mixture of air and methanol. The closure of the choke valve to the predetermined extent decreases the air-fuel ratio of the air-hydrocarbon fuel mixture produced by the primary carburetor 122h compared with the air-fuel ratio obtained during normal engine operation (i.e., the mixture is enriched). The rich air-fuel mixture is introduced through the primary intake pipe and intake port 120h and 112h into the main combustion chamber and through the horizontal passage 480h and secondary intake passage and intake port 482h and 115h into the trap chamber 105h because the second shut-off valve 840 is open at this time. The rich mixture introduced into the trap chamber is thus reliably ignited by a spark plug 118h to assure a smooth engine operation when the engine is at a low temperature. The use of the horizontal draft, variable venturi carburetor 122h provides an advantage in that a part of the fuel jetted into the venturi of the carburetor flows along the bottom of a horizontal part 121h'' of the elbow pipe. This fuel part flows into the horizontal passage 480h. When the second shut-off valve 840 is open (i.e., when the reactor vessel 442h is at a low temperature), part of the fuel flows from the horizontal passage 480h into the secondary intake passage 482h. Thus this fuel will enrich the air-fuel mixture flowing through the secondary intake pipe 115h into the trap chamber 105h. In other words, the mixture supplied to the trap chamber 105h is richer than the mixture supplied to the main combustion chamber 110h, so that a stratified fuel charge is effectively attained.

The engine operation is continued and, when the catalyst bed in the reactor vessel 442h is heated by the engine exhaust gas to a temperature sufficiently high enough to convert the air-methanol mixture into a reformed gaseous mixture, the resistance of the thermistor 732h is decreased, so that the output of the amplifier 752h becomes lower than the preset voltage for the comparator 754h to thereby render output of the comparator "1" with the result that the first and second transistors 756h and 854 become conductive and nonconductive, respectively. The solenoids 734h and 740h are therefore energized to move the shut-off valve 736h and the choke valve 742h to their full open positions. On the other hand, as the solenoid 842 is deenergized, the second shut-off valve 840 is closed by the spring 844 to shut-off the communication between the primary and secondary fuel circuits. Thus, the secondary carburetor 432h is subjected to a vacuum in the secondary fuel circuit and thus produces a mixture of air and methanol at a predetermined air-methanol ratio which is less than 2. The air-methanol mixture thus produced is ignited by a spark plug 462h and then introduced into the reforming reactor vessel 442h in which the mixture is converted by the heated catalysts into a reformed gaseous mixture rich with hydrogen.

On the other hand, the air-fuel ratio of the air-hydrocarbon fuel mixture produced by the primary carburetor 122h is increased (the mixture becomes lean) because the choke valve 742h is fully open. The flow of the reformed gaseous mixture into the trap chamber 105h and of the air-hydrocarbon fuel mixture into the main combustion 110h are controlled by the primary and secondary throttle valves 126h and 436h. The reformed gaseous mixture introduced into the trap chamber 105h is reliably and stably ignited by the spark plug 118h because of the existence of hydrogen in the mixture to thereby form a flame which spurts as a torch jet from the torch port 107h into the main combustion chamber 110h to reliably ignite the lean air-hydrocarbon fuel mixture therein. Because of the ignition and combustion of the lean air-fuel mixture, the emission of harmful components of the engine exhaust gas is greatly reduced.

It has been found that, when the hydrocarbon fuel supplied to the main combustion chamber is gasoline, the preferable ratio of the methanol supplied to the trap chamber relative to the total of the gasoline and methanol is from 5 to 30% by liquid volume. If the ratio is less than 5% by liquid volume, there occurs a problem in that the amount of hydrogen included in the reformed gaseous mixture supplied to the trap chamber is insufficient and a misfire is caused with resultant increase in HC in the engine exhaust gas and a difficulty of smoothly operating the engine. On the other hand, if the ratio is more than 30% by liquid volume, there also occurs a problem in that the volumetric ratio of the reformed gaseous mixture relative to the total air sucked into the engine is so large that the efficiency of charge is lowered with a resultant drop in the engine output and waste of expensive methanol.

Figure 14:
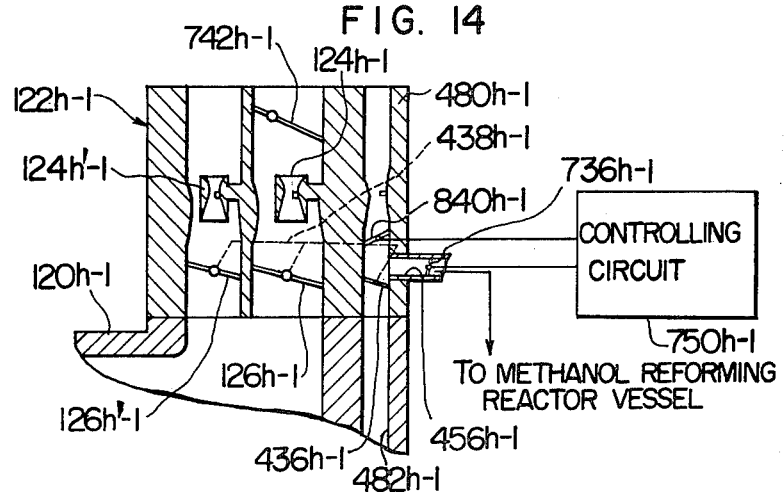
FIG. 14 illustrates a modification of the eighth embodiment in an enlarged, diagrammatic, fragmentary, sectional side elevation.

FIG. 14 illustrates a modification of the eighth embodiment. The modified internal combustion engine is different from the internal combustion engine 80 in the following points. The modified engine includes a primary carburetor 122h-1 of a down draft, two barrel, two stage type connected to the upstream end of a primary intake pipe 120h-1. The carburetor 122h-1 is generally similar in construction to the primary carburetor 122d, of the fourth embodiment shown in FIG. 5 and comprises a pair of venturii 124h-1 and 124'-1 disposed in respective barrels. Throttle valves 126h-1 and 126h'-1 are disposed downstream of the venturii 124h-1 and 124h'-1, respectively. An automatic choke valve 742h-1 actuated by a conventional actuator such as spiral bimetal (not shown) is provided in one of the barrels of the primary carburetor 122h-1 upstream of the venturi 124h-1.

A secondary fuel circuit comprises a down draft type carburetor 480h-1 which is integral with the primary carburetor 122h-1 and which is similar in construction to the secondary carburetor 480 of the fourth embodiment shown in FIG. 5. The secondary carburetor is connected at its downstream end to a secondary intake passage 482h-1 in which a secondary throttle valve 436h-1 is provided and operatively connected to the throttle valves 126h-1 and 126h'-1 of the primary fuel circuit by a conventional connecting means such as a link mechanism 438h-1.

The secondary fuel circuit is connected with a passage 456h-1 at a point upstream of the secondary throttle valve 436h-1. The passage 456h-1 is connected to a methanol reforming system which is not shown but may be similar in construction to that shown in FIG. 11. A first shut-off valve 736h-1 which may be similar in construction to the shut-off valve 736h shown in FIG. 12 is provided in the passage 456h-1. A second shut-off valve 840h-1 which is similar in construction to the valve 840 shown in FIG. 12 is provided in the secondary fuel circuit upstream of the point of the connection between the secondary fuel circuit and the passage 456h-1. The first and second shut-off valves 736h-1 and 840h-1 are designed to the actuated by solenoids (not shown) which are electrically connected to a controlling circuit 750h-1 which is similar in construction to the controlling circuit 750h and which is electrically connected to a thermistor (not shown) mounted on a reactor vessel (not shown) of the methanol reforming system (not shown).

With the modified embodiment, when the interior of the reactor vessel is at a low temperature, the first shut-off valve 736h-1 is closed by the operation of the controlling circuit 750h-1, so that a trap chamber of the engine is supplied with a rich mixture of air and hydrocarbon fuel produced by the secondary carburetor 480h-1. On the other hand, a main combustion chamber of the engine is supplied with a mixture of air and fuel produced by the primary carburetor 122h-1 at an air-fuel ratio which accords with the degree of the opening of the automatic choke valve 742h-1. Thus, a stratified charge of fuel is attained in the engine and is reliably ignited and burnt in the engine in the manner described hereinabove. When the interior of the reactor vessel is heated by the engine exhaust gas, the second shut-off valve 840h-1 is closed and the first shut-off valve 736h-1 is opened, so that a reformed gaseous mixture rich with hydrogen is produced in the methanol reforming system (not shown) and supplied through the passage 456h-1 into the secondary fuel circuit and thus into the trap chamber. The engine operation with a lean air-fuel mixture which includes hydrogen will proceed reliably in the manner already discussed above.

Figure 15:
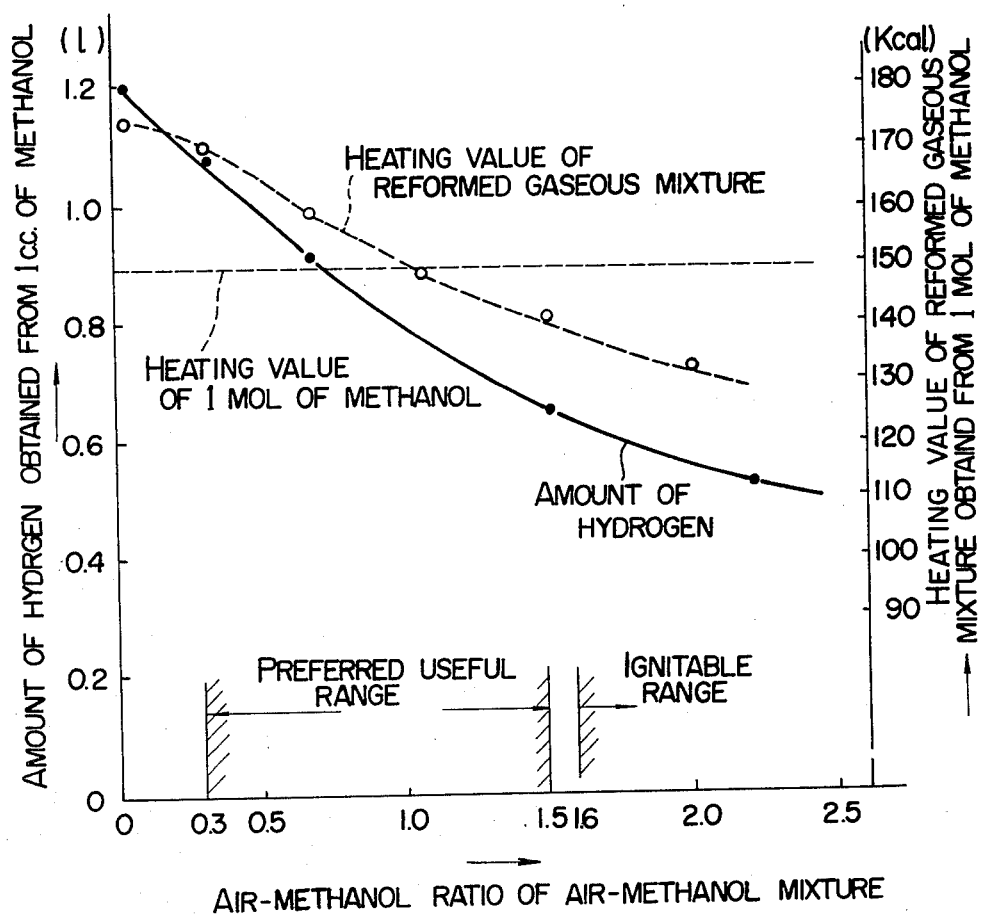
FIG. 15 graphically illustrates the relationship between the amount of hydrogen (liter) obtained from 1 cubic centimeter of methanol and the air-methanol ratio of an air-methanol mixture and the relationship between the heat of combustion (k cal.) of a reformed gaseous mixture obtained from 1 mol of methanol and the air-methanol ratio of the air-methanol mixture.
Figure 16A:
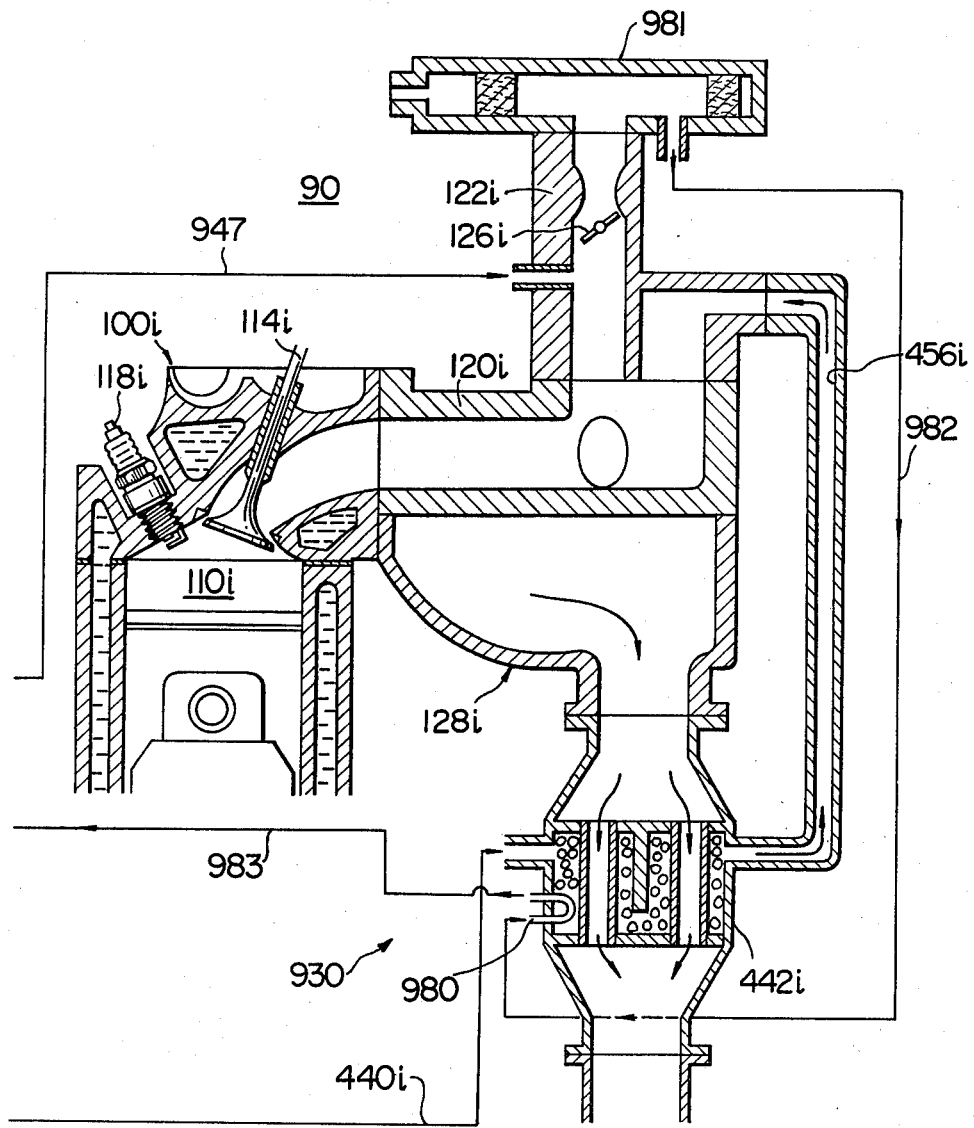
FIG. 16A is a diagrammatic, fragmentary, sectional side elevation of a part of a ninth embodiment of the invention.
Figure 17:
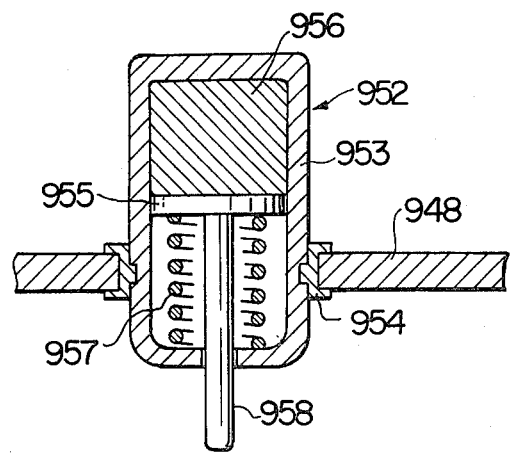
FIG. 17 illustrates in an enlarged scale a heat expansible means employed in a methanol reforming system of the ninth embodiment shown in FIG. 16B.

FIGS. 16A, 16B and 17 illustrate a ninth embodiment of the invention. The seventh and eighth embodiments of the invention described above are designed such that the supply of methanol to the reactor vessel is stopped when the catalyst bed therein is at a low temperature. The ninth embodiment of the invention, however, is designed particularly in the consideration of the following points. With reference to FIG. 15, it graphically illustrates the relationship of the amount of hydrogen (liter) obtained from 1 cubic centimeter of methanol relative to the air-methanol ratio of air-methanol mixture and the relationship of the heating value (k cal.) of reformed gaseous mixture obtained from 1 mol of methanol relative to the air-methanol ratio. In converting a mixture of air and methanol into a reformed gaseous mixture, the air-methanol ratio of the mixture ranging from 0.3 to 1.5 is practically preferred with respect to the view points of preventing production of soot and of the hydrogen content in the reformed gaseous mixture. With the air-methanol ratio of less than 1.6, it is difficult to obtain a reforming reaction when a reforming reactor vessel is at a low temperature. As will be seen in FIG. 15, however, it has been recognized that an air-methanol mixture at an air-methanol ratio of more than 1.6 is easily ignitable by a spark plug and that this ignition induces a sufficient reforming reaction in the reactor vessel. It will be also seen in FIG. 15 that even if the air-methanol ratio is increased to a value within a range from 1.6 to 2.0, the amount of hydrogen contained in the reformed gaseous mixture and the heating value of the reformed gaseous mixture are not extremely reduced. Thus, the ninth embodiment is provided with air-methanol ratio adjusting means by which the air-methanol ratio of the air-methanol mixture is controlled to be more than 1.6 when the reactor vessel is at a low temperature and the airmethanol ratio is controlled to be within a range from 0.3 to 1.5 when the reactor vessel is heated to a temperature sufficiently high enough for the reforming reaction by the action of catalysts in the reactor vessel.

Referring to FIGS. 16A and 16B, the ninth embodiment is generally designated by 90 and includes an engine body which is generally indicated by 100$i$ and generally similar in construction to the engine body 100$a$ of the first embodiment of the invention shown in FIG. 2. Similar parts of the engine body 100$i$ are indicated by similar reference numerals with a character "i" added.

A methanol reforming system employed in the embodiment includes a secondary carburetor 932 for producing a mixture of air and methanol. A secondary throttle valve 936 is disposed in the system downstream of the secondary carburetor 932. The part of the methanol reforming system 930 downstream of the secondary throttle valve 936 is substantially similar in construction to the corresponding part of the methanol reforming system 430 of the fourth embodiment shown in FIG. 5 with the exception that the system 930 is not provided with a cooler for cooling a reformed gaseous mixture. The parts and elements of the system 930 similar to those of the system 430 are indicated by similar reference numerals added with a character "i". The downstream end of the methanol reforming system 930 is connected to a primary fuel circuit at a point downstream of a primary throttle valve 126$i$ so that a reformed gaseous mixture converted from the air-methanol mixture by the action of catalysts in a reforming reactor vessel 442$i$ is mixed in an intake ipe 120$i$ with a mixture of air and hydrocarbon fuel produced by a primary carburetor 122$i$ to form a composite mixture which is then introduced into a combustion chamber 110$i$ and ignited therein by a spark plug 118$i$.

The air-methanol ratio adjusting means mentioned above is generally indicated by 950 and includes an air conduit 982 interconnecting the interior of an air cleaner 981 on the top of the primary carburetor and one end of a temperature detector 980 comprising a U-shaped tube of a metal mounted on the reactor vessel 442$a$ with the looped end of the tube extending into the catalyst bed within the vessel so that the air from the air cleaner 981 flows through the temperature detector 980 in heat-exchange relationship with the catalyst particles. The air from the air cleaner 946 is heated when the air flows through the temperature detector 980. The heated air then flows through a second air conduit 983 into a temperature measuring chamber 944 defined by a housing 945, from which chamber the air is returned through a third air conduit 947 into the primary fuel circuit downstream of the primary throttle valve 126$i$. The housing 945 is mounted on an upstream extension 934 of the carburetor 932. The temperature measuring chamber 944 is defined between the housing 945 and a support plate 948 extending across the interior of the housing 945. The support plate 948 supports a expansible means 952 which comprises a cylinder member 953 rigidly mounted on the support plate 948 by means of a stay 954, a piston 955 reciprocally received within the cylinder member 953, a mass of heat expansible material 956 filled in the space defined between the cylinder member 953 and the piston 955 and a coil spring 957 urging the piston against the heat expansible material 956. The heat expansible material may be an inorganic compound such as MgO, a metal such as Pb or an alloyed metal such as solder (Pb-Sn). In the case where the second air conduit 942 is so long that the air heated during its passage through the temperature detector 940 is substantially cooled before the air reaches the temperature measuring chamber 944, the heat expansible material may preferably be paraffin.

Thus, the piston 955 will be moved downwardly when the heat expansible material 956 is expanded by the heated air supplied to the temperature measuring chamber 944. The piston 955 has a piston rod 958 which is in engagement with the upper surface of a slide plate 960 which is slidably received in the housing 945 beneath the support plate 948. A piston-type valve 962 is slidably received in the housing 945 beneath the slide plate 960 and has a valve part 963 which slidably extends into an air intake passage 935 in the carburetor extension 934 through a lateral opening 964 formed in the peripheral wall of the carburetor extension 934 so that the valve part 963 of the piston-type valve 962 varies the sectional area of the air intake passage 935. The space between the slide plate 960 and the carburetor extension 934 is divided by the piston-type valve 962 into upper and lower chambers 966 and 968. A compression coil spring 970 is disposed in the upper chamber 966 and extends between the slide plate 960 and the piston-type valve 962. The pressure on the piston-type valve 962 exerted by the spring 970 will be varied by the sliding movement of the slide plate 960 which movement is caused by the expansion or contraction of the heat expansible material 960. The upper chamber 966 is always in communication with the air intake passage 935 downstream of the valve part 963 through a passage 971 while the lower chamber 968 is also always communicated with the air intake passage 935 upstream of the valve part 963 through a passage 972 so that the upper chamber is subjected to a pressure downstream of the valve part 963 while the lower chamber is to the pressure (atmospheric pressure) upstream of the valve part. The piston-type valve 962 is operative to adjust the pressure difference in accordance with the load applied by the spring 970 (i.e., the displacement of the piston 955 caused by the expansion or contraction of the heat expansible material 956 due to temperature variation in the temperature measuring chamber 944).

The carburetor 932 comprises a carburetor housing 934 which defines therein a float chamber 936 on the under side of the air intake passage 935 and a space on the upper side of the air intake passage 935. A diaphragm 938 extends substantially horizontally across the space to divide the same into a first pressure chamber 939 and a second pressure chamber 940. A compression coil spring 939a is disposed in the first pressure chamber 939 to downwardly bias the diaphragm 938. A suction piston 941 is mounted on the under surface of the diaphragm 938 and slidably extends across the air intake passage 935 toward the float chamber 936. A needle 942 is also mounted on the diaphragm 938 coaxially with the suction piston 941 and reciprocally extends into an opening of a nozzle 943 extending from the air intake passage 935 into the float chamber 936 and terminating an open bottom end positioned adjacent to the bottom of the float chamber. The first chamber 939 is communicated by a passage 939b with the air intake passage 935 downstream of the suction piston 941, while the second chamber 940 is communicated with the air intake passage 935 upstream of the suction piston 941. The suction piston 941 is movable up and down depending upon the differential pressure across the diaphragm 938 to vary the cross-sectional area of the air intake passage 935 adjacent to the opening of the nozzle 943 so that the differential pressure across the suction piston 941 is maintained at a predetermined constant value. The float chamber 936 is vented by an air vent 973. The float chamber can be drained by removing a blind plug 946 from the bottom of the chamber. The interior of the nozzle 943 is communicated with the second pressure chamber 940 by an air bleeder.

In operation, the temperature in the reforming reactor vessel 442i just after the cold-start of the engine is low. Thus, the air which has passed through the temperature detector 980 is at a low temperature, so that the heat expansible material 960 of the heat expansible means 952 in the temperature measuring chamber 944 is not expanded. Accordingly, the spring 970 does not exert a heavy load to the piston-type valve 962 with the result that the difference between the pressures upstream of the valve part 963 and the pressure downstream thereof is of a small value. In other words, the pressure drop at the part of the air intake passage 935 adjacent to the opening of the nozzle 943 is so small that the carburetor 932 produces a mixture of air from the intake passage 935 and methanol jetted from the nozzle 943 at a relatively large air-methanol ratio of more than about 1.6. At this air-methanol ratio, the air-methanol mixture is ignitable by the spark plug 462i, as will be seen in FIG. 15. By this ignition, a methanol reforming reaction is certainly induced in the reactor vessel 442i even if the vessel is at the low temperature, whereby the air-methanol mixture is converted into a reformed gaseous mixture rich with hydrogen.

By a continuous operation of the engine, the catalyst bed in the reactor vessel 442i is heated to an elevated temperature with the result that the air passing through the temperature detector 980 is also heated. The heated air is introduced into the temperature measuring chamber 944, so that the heat expansible material 960 of the heat expansible means 952 is expanded with resultant increase in the load on the compression spring 970, which causes downward displacement of the valve part 963 of the piston-type valve 962 into the air intake passage 935, whereby the pressure drop downstream of the valve part 963 and thus the pressure drop at the section adjacent to the opening of the nozzle 943 is increased. For the reason, the air-methanol ratio of the air-methanol mixture produced by the carburetor 932 is gradually decreased. When the catalyst bed in the reactor vessel is heated to a temperature high enough for the reforming reaction, the carburetor 932 produces the air-methanol mixture at the optimum air-methanol ratio which is within the range of from 0.3 to 1.5. The mixture is converted in the reactor vessel 442i into a reformed gaseous mixture rich with hydrogen in such a manner that the conversion does not produce soot.

The reformed gaseous mixture flows through the passage 456i into the intake pipe 120i in which the mixture is mixed with a lean air-hydrocarbon fuel mixture from the primary carburetor 122i to form a composite mixture which is supplied into the combustion chamber 110i. The existence of hydrogen in the composite mixture assures a reliable combustion of a very lean air-fuel mixture in the combustion chamber and a reduction in the emission of harmful components of the engine exhaust gas. It will be also apparent from the above description that the air-methanol mixture is converted into the reformed gaseous mixture even at the time the engine is at a low temperature, whereby the engine can be smoothly operated even from the time the engine is at the low temperature. In the ninth embodiment, moreover, it has been found that, in the case where gasoline is used as the hydrocarbon fuel, a preferred range of the ratio of the methanol supply relative to the total of gasoline and methanol supplies in the view points of the engine operability and the emission control.

The heat expansion means 952 is designed to responsive to be the temperature variation in the air heated by the heat in the reactor vessel 442i. However, it is possible to introduce the engine exhaust gas, the reformed gaseous mixture or the engine cooling water into the temperature measuring chamber 954 in order that the temperature within the reactor vessel 442i is directly or indirectly detected.

Figure 18:
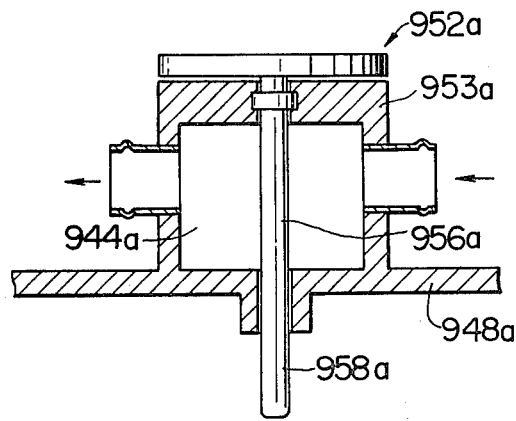
FIG. 18 illustrates in partially sectional side elevation, a modification of the heat expansible means shown in FIGS. 16B and 17.

FIG. 18 illustrates a modified heat expansible means 952a which is particularly designed to be operable with a high-temperature gas such as engine exhaust gas. The heat expansible means 952a comprises a rod member 956a of a heat-resistant metal extending through a temperature measuring chamber 944a defined in a housing 953a which is rigidly secured or connected to a support plate 948a. The rod member 956a is secured at its top end to the housing 953a and has a lower end portion 958a which is freely movable through an opening in the support plate 948a. The lower end extremity of the rod member 958a may be in abutment contact with the slide plate 960 so that the temperature variation can be directly converted into the displacement of the slide plate 960.

The ninth embodiment has been described as being directed a normal internal combustion engine with a single combustion chamber. The methanol reforming system of the embodiment may also be effectively used in a stratified charge internal combustion engine with a trap chamber in such a manner that the air-methanol ratio of an air-methanol mixture fed to the reforming reactor vessel is controlled in accordance with the temperature in the reactor vessel.

What is claimed is:
1. An internal combustion engine comprising:
a combustion chamber;
a spark plug;
an intake and exhaust system; said intake system including first and second fuel circuits;
said first fuel circuit comprising a choke valve, a first carburetor disposed in said first fuel circuit downstream of said choke valve for producing a mixture of air and gasoline, and a first throttle valve disposed in said first fuel circuit downstream of said first carburetor;

said second fuel circuit comprising a second carburetor for producing mixture of air and methanol, a catalytic reactor disposed in said second fuel circuit downstream of said second carburetor and containing a catalyst bed so arranged as to be heated by the engine exhaust gases flowing through said exhaust system, a second throttle valve disposed in said second fuel circuit and operatively connected to said first throttle valve for operation therewith, and a shut-off valve disposed in said second fuel circuit to control the communication between said combustion chamber and said second carburetor;

said catalytic reactor being so constructed as to cause the air-methanol mixture to flow through said catalyst bed and being rendered operative to facilitate a catalytic conversion of said air-methanol mixture into a reformed gaseous mixture containing free hydrogen when said catalyst bed is heated to a temperature higher than a predetermined temperature; and means responsive to the temperature of said catalyst bed to actuate said choke valve and said shut-off valve, the arrangement being such that, when said catalyst bed temperature is below said predetermined temperature, said shut-off valve is closed to render said second carburetor inoperative to produce the air-methanol mixture and said choke valve is at least partially closed to enrich the air-gasoline mixture produced by said first carburetor whereby said combustion chamber is supplied solely with the enriched air-gasoline mixture, and such that, when said catalyst bed temperature is higher than said predetermined temperature, said choke valve is fully opened to increase the air-gasoline ratio of the air-gasoline mixture produced by said first carburetor and said shut-off valve is opened to cause said second carburetor to produce the air-methanol mixture and thus cause said catalytic reactor to produce the reformed gaseous mixture whereby said combustion chamber is supplied with both the lean air-gasoline mixture and the reformed gaseous mixture.

2. An internal combustion engine as defined in claim 1, wherein said temperature responsive means comprises a temperature detector mounted on said catalytic reactor, solenoid means operatively associated with said choke valve and said shut-off valve, respectively, and an electronic controlling means electrically connected to said temperature detector and said solenoid means for controlling said solenoid means in response to said temperature detector.

3. An internal combustion engine as defined in claim 1, wherein said second fuel circuit has its downstream end connected to said first fuel circuit downstream of said first throttle valve and wherein said shut-off valve is disposed in said second fuel circuit between said catalytic reactor and said second throttle valve.

4. An internal combustion engine comprising:
a main combustion chamber;
an auxiliary combustion chamber always communicated with said main combustion chamber through a torch port;
a spark plug associated with said auxiliary combustion chamber;
intake and exhaust systems; said intake system including first and second fuel circuits having downstream ends associated with said main and auxiliary combustion chambers, respectively;

said first fuel circuit comprising a choke valve, a first carburetor disposed in said first fuel circuit downstream of said choke valve for producing a mixture of air and gasoline, and a first throttle valve disposed in said first fuel circuit downstream of said first carburetor;

said second fuel circuit comprising a second carburetor for producing a mixture of air and methanol, a catalytic reactor disposed in said second fuel circuit downstream of said second carburetor and containing a catalyst bed so arranged as to be heated by the engine exhaust gases flowing through said exhaust system, a second throttle valve disposed in said second fuel circuit and operatively connected to said first throttle valve for operation therewith, and a first shut-off valve disposed in said second fuel circuit between said second throttle valve and said reactor to control the communication between said auxiliary combustion chamber and said second carburetor;

a passage connecting said first fuel circuit between said first carburetor and said first throttle valve to said second fuel circuit between said second throttle valve and said first shut-off valve;

a second shut-off valve disposed in said passage to control the communication between said first and second fuel circuits;

said catalytic reactor being so constructed as to cause the air-methanol mixture to flow through said catalyst bed and being rendered operative to facilitate a catalytic conversion of said air-methanol mixture into a reformed gaseous mixture containing free hydrogen gas when said catalyst bed is heated to a temperature higher than a predetermined temperature;

means responsive to the temperature of said catalyst bed to actuate said choke valve and said first and second shut-off valves, the arrangement being such that, when said catalyst bed temperature is below said predetermined temperature, said first shut-off valve is closed to render said second carburetor inoperative to produce the air-methanol mixture and said choke valve is at least partially closed to enrich the air-gasoline mixture produced by said first carburetor whereas said second shut-off valve is opened whereby said main and auxiliary combustion chambers are both supplied with the enriched air-gasoline mixture, and such that, when said catalyst bed temperature is higher than said predetermined temperature, said choke valve is fully opened to increase the air-gasoline ratio of the air-gasoline mixture produced by said first carburetor and said first shut-off valve is opened to cause said second carburetor to produce the air-methanol mixture and thus cause said catalytic reactor to produce the reformed gaseous mixture whereas said second shut-off valve is closed whereby said main combustion chamber is supplied with the lean air-gasoline mixture while said auxiliary combustion chamber is supplied with the reformed gaseous mixture.

5. An internal combustion engine as defined in claim 4, wherein said first fuel circuit includes a substantially horizontal section, said first carburetor is of a horizontal draft type and is disposed in said horizontal section of said first fuel circuit, a part of the gasoline which is jetted into the venturi of said horizontal draft type carburetor flowing along the bottom of said horizontal section of said first fuel circuit, and wherein said passage is so disposed that said part of the gasoline is received in and flows through said passage into said second fuel circuit downstream of said first shut-off valve when said second shut-off valve is opened.

6. An internal combustion engine as defined in claim 4, wherein said temperature responsive means comprises a temperature detector mounted on said catalytic reactor, solenoid means operatively associated with said choke valve and said first and second shut-off valves, respectively, and an electronic controlling means electrically connected to said temperature detector and said solenoid means for controlling said solenoid means in response to said temperature detector.

7. An internal combustion engine comprising;
a main combustion chamber;
an auxiliary combustion chamber always communicated with said main combustion chamber through a torch port;
a spark plug associated with said auxiliary combustion chamber;
intake and exhaust systems; said intake systems including first and second fuel circuits having downstream ends associated with said main and auxiliary combustion chambers, respectively;
said first fuel circuit comprising a first carburetor of a two barrel, two stage type with a choke valve disposed in one of the two barrels upstream of the venturi of said one barrel and with first and second throttle valves disposed in respective barrels downstream of the venturi therein and operatively connected to each other, said first carburetor being adapted to produce a mixture of air and gasoline at an air-gasoline ratio which varies in accordance with the degree of the opening of said choke valve;
said second fuel circuit including a second carburetor for producing a rich mixture of air and gasoline, a third throttle valve disposed in said second fuel circuit downstream of said second carburetor and operatively connected to said first and second throttle valves for operation therewith, a first shut-off valve disposed in said second fuel circuit to control the communication between said auxiliary combustion chamber and said second carburetor, and a methanol reforming system having a downstream end connected to said second fuel circuit between said third throttle valve and said first shut-off valve;
said methanol reforming system including a third carburetor for producing a mixture of air and methanol, a catalytic reactor disposed downstream of said third carburetor and containing a catalyst bed so arranged as to be heated by the engine exhaust gases flowing through said exhaust system and a second shut-off valve for controlling the communication between said auxiliary combustion chamber and said third carburetor;
said catalytic reactor being so constructed as to cause the air-methanol mixture to flow through said catalyst bed and being rendered operative to facilitate a catalytic conversion of said air-methanol mixture into a reformed gaseous mixture containing free hydrogen gas when said catalyst bed is heated to a temperature higher than a predetermined temperature; and
means responsive to the temperature of said catalyst bed to actuate said first and second shut-off valves, the arrangement being such that, when said catalyst bed temperature is below said predetermined temperature, said second shut-off valve is closed and said first shut-off valve is opened to cause said second carburetor to produce the rich air-gasoline mixture to be fed into said auxiliary combustion chamber, and such that, when said catalyst bed temperature is higher than said predetermined temperature, said first shut-off valve is closed and said second shut-off valve is opened to cause said third carburetor to produce the air-methanol mixture and thus to cause said catalytic reactor to produce the reformed gaseous mixture to be fed into said auxiliary combustion chamber.

* * * * *